United States Patent
King

(10) Patent No.: US 10,418,813 B1
(45) Date of Patent: Sep. 17, 2019

(54) MODULAR POWER ADAPTERS AND METHODS OF IMPLEMENTING MODULAR POWER ADAPTERS

(71) Applicant: John Joseph King, Wheaton, IL (US)

(72) Inventor: John Joseph King, Wheaton, IL (US)

(73) Assignee: Smart Power Partners LLC, Wheaton, IL (US)

( * ) Notice: Subject to any disclaimer, the term of this patent is extended or adjusted under 35 U.S.C. 154(b) by 84 days.

(21) Appl. No.: 15/645,745

(22) Filed: Jul. 10, 2017

Related U.S. Application Data

(60) Provisional application No. 62/480,389, filed on Apr. 1, 2017.

(51) Int. Cl.
| | | |
|---|---|---|
| *H01H 3/04* | (2006.01) | |
| *H01H 23/14* | (2006.01) | |
| *H02J 3/14* | (2006.01) | |
| *H02J 13/00* | (2006.01) | |
| *H01R 24/68* | (2011.01) | |
| *H01R 105/00* | (2006.01) | |

(52) U.S. Cl.
CPC ............ *H02J 3/14* (2013.01); *H01R 24/68* (2013.01); *H02J 13/0017* (2013.01); *H01R 2105/00* (2013.01); *H02J 2003/143* (2013.01)

(58) Field of Classification Search
CPC combination set(s) only.
See application file for complete search history.

(56) References Cited

U.S. PATENT DOCUMENTS

| | | |
|---|---|---|
| 3,588,489 A | 6/1971 | Gaines |
| 3,609,647 A | 9/1971 | Castellano |
| 3,879,101 A | 4/1975 | McKissic |
| 3,895,225 A | 7/1975 | Prior |
| 4,117,258 A | 9/1978 | Shanker |
| 4,165,443 A | 8/1979 | Figart |
| 4,485,282 A | 11/1984 | Lee |
| 4,522,455 A | 6/1985 | Johnson |
| 4,546,418 A | 10/1985 | Baggio |
| 4,546,419 A | 10/1985 | Johnson |
| 4,636,914 A | 1/1987 | Belli |

(Continued)

FOREIGN PATENT DOCUMENTS

| | | |
|---|---|---|
| CN | 104934796 | 9/2015 |
| DE | 102011054357 | 4/2013 |

(Continued)

OTHER PUBLICATIONS

GE Smart Digital Timer, published Jul. 2010.

(Continued)

*Primary Examiner* — An T Luu

(57) ABSTRACT

A power switch configured to apply power to a device is described. The power comprises a switching module having a switch for selectively applying power to a device based upon control signals; and a control module removably coupled to the switching module and in communication with the switching module when the control module is attached to the switching module; wherein the control module comprises a wireless communication circuit and provides the control signals to the switching module to enable a switching operation of the power switch. A method of implementing a power switch configured to apply power to a device is also described.

20 Claims, 10 Drawing Sheets

(56) References Cited

U.S. PATENT DOCUMENTS

| | | |
|---|---|---|
| 4,780,088 A | 10/1988 | Means |
| 4,893,062 A | 1/1990 | D'Aleo |
| 5,064,386 A | 11/1991 | Dale et al. |
| 5,207,317 A | 5/1993 | Bryde |
| 5,229,925 A | 7/1993 | Spencer |
| 5,264,761 A | 11/1993 | Johnson |
| 5,357,170 A | 10/1994 | Luchaco |
| 5,397,929 A | 3/1995 | Hogarth et al. |
| 5,399,806 A | 3/1995 | Olson |
| 5,471,012 A | 11/1995 | Opel |
| 5,473,517 A | 12/1995 | Blackman |
| 5,486,725 A | 1/1996 | Keizer |
| 5,574,256 A | 11/1996 | Cottone |
| 5,637,930 A | 6/1997 | Rowen |
| 5,735,710 A | 4/1998 | Blaauboer et al. |
| 5,735,714 A | 4/1998 | Orlando et al. |
| 5,813,873 A | 9/1998 | McBain |
| 5,915,984 A | 6/1999 | Rupert |
| 5,957,564 A | 9/1999 | Bruce |
| 5,990,635 A | 11/1999 | Ference |
| 6,000,807 A | 12/1999 | Moreland |
| 6,005,308 A | 12/1999 | Bryde |
| 6,010,228 A | 1/2000 | Blackman |
| 6,010,288 A | 1/2000 | Wisser |
| 6,045,232 A | 4/2000 | Buckmaster |
| 6,087,588 A | 7/2000 | Soules |
| 6,154,774 A | 11/2000 | Furlong |
| 6,169,377 B1 | 1/2001 | Bryde |
| 6,218,787 B1 | 4/2001 | Murcko |
| 6,309,248 B1 | 10/2001 | King |
| 6,376,770 B1 | 4/2002 | Hyde |
| 6,423,900 B1 | 7/2002 | Soules |
| 6,530,806 B2 | 3/2003 | Nelson |
| 6,540,536 B1 | 4/2003 | Young |
| 6,547,588 B1 | 4/2003 | Hsu |
| 6,617,511 B2 | 9/2003 | Schultz |
| 6,660,948 B2 | 12/2003 | Clegg |
| 6,664,468 B2 | 12/2003 | Jarasse |
| 6,666,712 B1 | 12/2003 | Kramer |
| 6,755,676 B2 | 6/2004 | Milan |
| 6,767,245 B2 | 7/2004 | King |
| 6,794,575 B1 | 9/2004 | McBain |
| 6,797,900 B2 | 9/2004 | Hoffman |
| 6,798,341 B1 | 9/2004 | Eckel |
| 6,805,469 B1 | 10/2004 | Barton |
| 6,843,680 B2 | 1/2005 | Gorman |
| 6,870,099 B1 | 3/2005 | Schultz |
| 6,884,111 B2 | 4/2005 | Gorman |
| 6,894,221 B2 | 5/2005 | Gorman |
| 6,909,921 B1 | 6/2005 | Bilger |
| 6,945,815 B1 | 9/2005 | Mullally |
| 6,989,489 B1 | 1/2006 | Savicki, Jr. |
| 7,045,975 B2 | 5/2006 | Evans |
| 7,081,009 B2 | 7/2006 | Gorman |
| 7,160,147 B1 | 1/2007 | Stephan |
| 7,161,313 B2 | 1/2007 | Piepgras |
| 7,192,289 B2 | 3/2007 | Kowalski |
| 7,202,613 B2 | 4/2007 | Morgan |
| 7,202,789 B2 | 4/2007 | Stilp |
| 7,232,336 B1 | 6/2007 | Evans |
| 7,257,465 B2 | 8/2007 | Perez |
| 7,273,392 B2 | 9/2007 | Fields |
| 7,285,721 B1 | 10/2007 | Savicki, Jr. |
| 7,360,912 B1 | 4/2008 | Savicki, Jr. |
| 7,365,964 B2 | 4/2008 | Donahue |
| 7,367,121 B1 | 5/2008 | Gorman |
| 7,391,297 B2 | 6/2008 | Cash |
| 7,400,239 B2 | 7/2008 | Kiko |
| 7,480,534 B2 | 1/2009 | Bray et al. |
| 7,549,893 B1 | 6/2009 | Walker |
| 7,576,285 B1 | 8/2009 | Savicki, Jr. |
| 7,641,491 B2 | 1/2010 | Altonen |
| 7,649,472 B1 | 1/2010 | Paterno |
| 7,687,940 B2 | 3/2010 | Mosebrook |
| 7,734,038 B2 | 6/2010 | Martich |
| 7,767,905 B2 | 8/2010 | Meyer |
| 7,791,282 B2 | 9/2010 | Yu |
| 7,818,906 B2 | 10/2010 | Hansen |
| 7,851,704 B2 | 12/2010 | Fitch et al. |
| 7,862,350 B2 | 1/2011 | Richter |
| 7,873,062 B2 | 1/2011 | Binder |
| 7,906,873 B1 | 3/2011 | Roosli |
| 7,964,989 B1 | 6/2011 | Puschnigg |
| 7,994,654 B2 | 8/2011 | Lee |
| 8,011,937 B2 | 9/2011 | Oddsen et al. |
| 8,052,485 B2 | 11/2011 | Lee |
| 8,058,552 B2 | 11/2011 | Kruse |
| 8,067,906 B2 | 11/2011 | Null |
| 8,160,838 B2 | 4/2012 | Ramin |
| 8,221,158 B2 | 7/2012 | Liao |
| 8,232,745 B2 | 7/2012 | Chemel |
| 8,243,918 B2 | 8/2012 | Hazani |
| 8,267,719 B1 | 9/2012 | Benoit |
| 8,339,054 B2 | 12/2012 | Yu |
| 8,344,667 B1 | 1/2013 | King |
| 8,360,810 B2 | 1/2013 | Binder |
| 8,384,241 B2 | 2/2013 | Chen |
| 8,419,435 B2 | 4/2013 | Perrone |
| 8,496,342 B2 | 7/2013 | Misener |
| 8,558,129 B2 | 10/2013 | Elliott |
| 8,602,799 B2 | 12/2013 | Ganta |
| 8,629,617 B2 | 1/2014 | Richards |
| 8,658,893 B1 | 2/2014 | Shotey |
| 8,668,347 B2 | 3/2014 | Ebeling |
| 8,710,770 B2 | 4/2014 | Woytowitz |
| 8,872,438 B2 | 10/2014 | Zhou |
| 8,886,785 B2 | 11/2014 | Apte |
| 9,007,186 B1 | 4/2015 | Krummey |
| 9,024,800 B2 | 5/2015 | Altonen |
| 9,030,789 B2 | 5/2015 | Benoit |
| 9,035,572 B1 | 5/2015 | Dolan |
| 9,095,053 B2 | 7/2015 | Trolese |
| 9,112,319 B2 | 8/2015 | Liao |
| 9,184,590 B2 | 11/2015 | Testani |
| 9,214,773 B2 | 12/2015 | Misener |
| 9,312,673 B2 | 4/2016 | Byrne |
| 9,325,132 B2 | 4/2016 | Hsu |
| 9,351,353 B2 | 5/2016 | Recker |
| 9,368,025 B2 | 6/2016 | Carmen |
| 9,380,685 B2 | 6/2016 | Shet |
| 9,386,668 B2 | 7/2016 | Knapp |
| 9,389,769 B1 | 7/2016 | O'Keeffe |
| 9,437,978 B2 | 9/2016 | Green |
| 9,520,671 B2 | 12/2016 | Misener |
| 9,544,975 B2 | 1/2017 | Giltaca |
| 9,589,461 B1 * | 3/2017 | Byrne .................. G08C 19/00 |
| 9,603,223 B2 | 3/2017 | Patel |
| 9,607,786 B2 | 3/2017 | Haines |
| 9,608,418 B1 | 3/2017 | Elberbaum |
| 9,620,945 B2 | 4/2017 | Rohmer |
| 9,640,962 B2 | 5/2017 | Hernandez Ramirez |
| 9,681,513 B2 | 6/2017 | Dadashnialehi |
| 9,692,236 B2 | 6/2017 | Wootton |
| 9,693,428 B2 | 6/2017 | Wagner |
| 9,699,863 B2 | 7/2017 | Weightman |
| 9,782,509 B2 | 10/2017 | Murahari |
| 9,793,697 B1 | 10/2017 | Colao |
| 9,799,469 B2 * | 10/2017 | Bailey .................. H01H 23/04 |
| 9,826,604 B2 | 11/2017 | Karc et al. |
| 9,762,056 B1 | 12/2017 | Miller |
| 9,837,813 B2 | 12/2017 | Newell |
| 9,866,990 B1 | 1/2018 | Cairns |
| 10,048,653 B2 | 8/2018 | Ostrovsky |
| 10,050,393 B1 | 8/2018 | Calabrese |
| 10,070,539 B2 * | 9/2018 | Gates .................. H02G 3/081 |
| 10,084,272 B1 | 9/2018 | Hayes |
| 10,175,996 B2 | 1/2019 | Byrne |
| 2002/0086567 A1 | 7/2002 | Cash |
| 2003/0021104 A1 | 1/2003 | Tsao |
| 2004/0051485 A1 | 3/2004 | Chansky |
| 2004/0077212 A1 | 4/2004 | Pulizzi |
| 2004/0177986 A1 | 9/2004 | Gorman |
| 2004/0218379 A1 | 11/2004 | Barton |
| 2004/0218411 A1 | 11/2004 | Luu |

(56) References Cited

U.S. PATENT DOCUMENTS

| | | |
|---|---|---|
| 2005/0055106 A1 | 3/2005 | Beutler |
| 2005/0075741 A1 | 4/2005 | Altmann |
| 2005/0125083 A1 | 6/2005 | Kiko |
| 2005/0136972 A1 | 6/2005 | Smith |
| 2005/0194243 A1* | 9/2005 | Prineppi ............... H01H 3/26 200/556 |
| 2006/0025012 A1 | 2/2006 | Fields |
| 2006/0262462 A1 | 11/2006 | Barton |
| 2007/0072476 A1 | 3/2007 | Milan |
| 2007/0216318 A1 | 9/2007 | Altonen |
| 2008/0012423 A1 | 1/2008 | Mimran |
| 2008/0020632 A1 | 1/2008 | Gorman |
| 2008/0079568 A1 | 4/2008 | Primous |
| 2009/0039706 A1 | 2/2009 | Kotlyar |
| 2009/0058707 A1 | 3/2009 | Craze |
| 2009/0107693 A1 | 4/2009 | Meyer |
| 2009/0194311 A1 | 4/2009 | Merrill |
| 2009/0180261 A1 | 7/2009 | Angelides |
| 2009/0189542 A1 | 7/2009 | Wu |
| 2009/0251127 A1 | 10/2009 | Kim |
| 2009/0278479 A1 | 11/2009 | Platner |
| 2010/0006648 A1 | 1/2010 | Grant |
| 2010/0026194 A1 | 2/2010 | Paton |
| 2010/0070100 A1 | 3/2010 | Finlinson |
| 2010/0130053 A1 | 5/2010 | Ziobro |
| 2010/0201267 A1 | 8/2010 | Bourquin |
| 2011/0031819 A1 | 2/2011 | Gunwall |
| 2011/0035029 A1 | 2/2011 | Yianni |
| 2011/0043034 A1 | 2/2011 | Pien |
| 2011/0148309 A1 | 6/2011 | Reid |
| 2011/0178650 A1 | 7/2011 | Picco |
| 2011/0287665 A1 | 11/2011 | Chien |
| 2012/0021623 A1 | 1/2012 | Gorman |
| 2012/0025717 A1 | 2/2012 | Klusmann |
| 2012/0066168 A1 | 3/2012 | Fadell |
| 2012/0088399 A1 | 4/2012 | Perritt |
| 2012/0088493 A1 | 4/2012 | Chen |
| 2012/0094511 A1 | 4/2012 | Sil |
| 2012/0195045 A1 | 8/2012 | King |
| 2012/0239773 A1 | 9/2012 | Blustein |
| 2012/0274219 A1 | 11/2012 | Woytowitz |
| 2012/0286940 A1 | 11/2012 | Carmen |
| 2012/0292174 A1* | 11/2012 | Mah ............... H01H 3/227 200/573 |
| 2012/0318657 A1 | 12/2012 | Hoffknecht |
| 2013/0026947 A1 | 1/2013 | Economy |
| 2013/0026953 A1 | 1/2013 | Woytowitz |
| 2013/0045624 A1 | 2/2013 | Snyder |
| 2013/0063042 A1 | 3/2013 | Bora |
| 2013/0147367 A1 | 3/2013 | Cowburn |
| 2013/0155723 A1 | 6/2013 | Coleman |
| 2013/0196535 A1 | 8/2013 | Utz |
| 2013/0240235 A1 | 9/2013 | Higashihama |
| 2013/0257315 A1 | 10/2013 | Restrepo |
| 2013/0267116 A1 | 10/2013 | Tin |
| 2014/0265883 A1 | 9/2014 | Mortun |
| 2014/0273618 A1 | 9/2014 | King |
| 2014/0285095 A1 | 9/2014 | Chemel |
| 2014/0320312 A1 | 10/2014 | Sager |
| 2014/0368977 A1 | 12/2014 | Lenny |
| 2015/0035476 A1 | 2/2015 | Frid |
| 2015/0136437 A1 | 5/2015 | Hitchman |
| 2015/0163867 A1 | 6/2015 | Recker |
| 2015/0168931 A1 | 6/2015 | Jin |
| 2015/0189726 A1 | 7/2015 | Spira |
| 2015/0228426 A1* | 8/2015 | Romano ............... H01H 3/22 200/331 |
| 2015/0229026 A1 | 8/2015 | Lindmark |
| 2015/0256355 A1 | 9/2015 | Pera |
| 2015/0263513 A1 | 9/2015 | Newell |
| 2015/0295438 A1 | 10/2015 | Herr |
| 2015/0351187 A1 | 12/2015 | McBryde |
| 2015/0357133 A1 | 12/2015 | Keirstead |
| 2015/0366039 A1 | 12/2015 | Noori |
| 2015/0373796 A1 | 12/2015 | Bahrehmand |
| 2015/0382436 A1 | 12/2015 | Kelly |
| 2016/0006202 A1 | 1/2016 | Dupuis |
| 2016/0007288 A1 | 1/2016 | Samardzija |
| 2016/0036819 A1 | 2/2016 | Zehavi |
| 2016/0044447 A1 | 2/2016 | Tetreault |
| 2016/0050695 A1 | 2/2016 | Bichot |
| 2016/0066130 A1 | 3/2016 | Bosua |
| 2016/0126031 A1 | 5/2016 | Wootton |
| 2016/0126950 A1 | 5/2016 | Lucantonio |
| 2016/0212832 A1 | 7/2016 | King |
| 2016/0219728 A1 | 7/2016 | Balyan |
| 2016/0233707 A1 | 8/2016 | Kidakarn |
| 2016/0255702 A1 | 9/2016 | Thompson |
| 2016/0322754 A1 | 11/2016 | Green |
| 2017/0033515 A1 | 2/2017 | Ziesler |
| 2017/0033566 A1 | 2/2017 | Jursch |
| 2017/0033942 A1 | 2/2017 | Koeninger |
| 2017/0054315 A1 | 2/2017 | Chien |
| 2017/0070090 A1 | 3/2017 | Miller |
| 2017/0105176 A1 | 4/2017 | Finnegan |
| 2017/0162985 A1 | 6/2017 | Randall |
| 2017/0221654 A1 | 8/2017 | Danowski |
| 2017/0238401 A1 | 8/2017 | Sadwick |
| 2017/0257096 A1 | 9/2017 | Lark |
| 2017/0257930 A1 | 9/2017 | Lark |
| 2017/0295623 A1 | 10/2017 | Pennycooke |
| 2017/0295624 A1 | 10/2017 | Lark |
| 2017/0295625 A1 | 10/2017 | Lark |
| 2017/0295630 A1 | 10/2017 | Lark |
| 2017/0295631 A1 | 10/2017 | Lark |
| 2018/0012710 A1 | 1/2018 | Lark |
| 2018/0013428 A1 | 1/2018 | Lark |
| 2018/0014381 A1 | 1/2018 | Lark |
| 2018/0014384 A1 | 1/2018 | Charlton |
| 2018/0014388 A1 | 1/2018 | Pennycooke |
| 2018/0014390 A1 | 1/2018 | Aylward |
| 2018/0014391 A1 | 1/2018 | Lark |
| 2018/0014392 A1 | 1/2018 | Charlton |
| 2018/0014393 A1 | 1/2018 | Cheung |
| 2018/0048710 A1 | 2/2018 | Altin |
| 2018/0070424 A1 | 3/2018 | Lark |
| 2018/0070429 A1 | 3/2018 | Lark |
| 2018/0070430 A1 | 3/2018 | Edwards |
| 2018/0070431 A1 | 3/2018 | Charlton |
| 2018/0107187 A1 | 4/2018 | Singh |
| 2018/0109999 A1 | 4/2018 | Finnegan |
| 2018/0168900 A1 | 6/2018 | McNeely |
| 2018/0210538 A1 | 7/2018 | Aimone |
| 2018/0233006 A1 | 8/2018 | Koniarek et al. |
| 2018/0316189 A1 | 11/2018 | Mozayeny |
| 2018/0359873 A1 | 12/2018 | Shemirani |
| 2018/0375313 A1 | 12/2018 | Misener |
| 2019/0027876 A1 | 1/2019 | Murahari |

FOREIGN PATENT DOCUMENTS

| | | |
|---|---|---|
| KR | 100801042 | 11/2006 |
| KR | 101174730 | 8/2012 |
| WO | 2013012170 | 1/2013 |
| WO | 2014047634 | 3/2014 |

OTHER PUBLICATIONS

GE Digital Time Switch, published Nov. 24, 2009.
SmartLink-INSTEON Smarthome, published Aug. 27, 2008.
Schlage LiNK RP200 Light Module User Manual, published Mar. 2009.
Brinks 44-1074 Timer User Manual, published 2010.
GE Wireless Lighting Control 45631 Keypad Controller User Manual, published Apr. 2010.
Sylvania SA 170 User Manual, published Aug. 17, 2005.
Intermatic SS8 User Manual, published Sep. 13, 2002.
Intermatic EJ500C User Manual, published Aug. 3, 2004.
Lutron Caseta Discover the Power of Smart Lighting, published Nov. 2017.
Sylvania Model SA135, published 2010.
GE SunSmart Digital Timer published 2010.

(56) References Cited

OTHER PUBLICATIONS

A System for Smart-Home Control of Appliances Based on Timer and Speech Interaction, Jan. 2006.
Brinks Home Office 441074B Timer, published Mar. 2010.
Control4 Squared Wired Configurable Keypad V2, published 2016.
Decora Wired Keypad Data Sheet Control C4-KCB, published 2014.
Legrand AlphaRex 3 The New Generation, published May, 2016.
Legrand Pass & Seymour Specification Grade Self-test GFCIs, published Dec. 2015.
Legrand Pass & Seymour Tamper-Resistant Duplex Outlet with Nightlight, published May 2014.
Legrand Time Switches and Modular Control Devices, published May 2016.
Leviton Renu Color Change Instructions, published 2010.
Lutron Energi TriPak, published Nov. 2014.
WiFi Smart Plug, Mini Outlets Smart Socket No Flub Required Timing Function Control Your Electric Devices from Anywhere, published 2017.
WiFi Smart Power Strip, Conico Smart Surge Protector with 4 USB Ports and 4 Smart AC Plugs, published 2017.
GE Touchsmart In-Wall Digital Timer, published 2014.
GE My Touch Smart In-Wall Digital Timer, published 2015.
Leviton Split Duplex Receptacle, published 2017.
Leviton Plug-in Outlet with Z-Wave Technology, published 2017.
Heath/Zenith Motion Sensor Light Control, published 2012.

\* cited by examiner

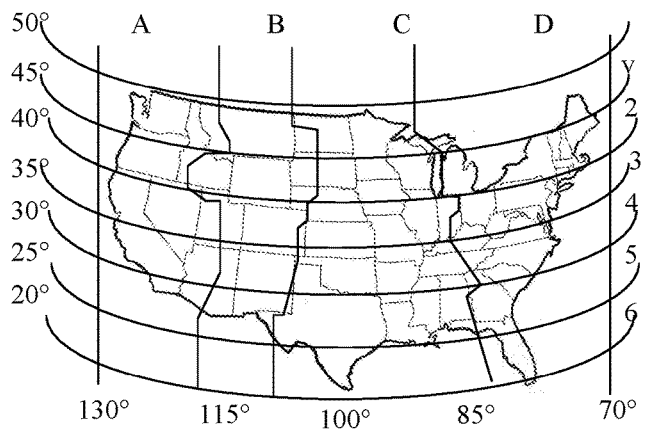

FIG. 24

| Latitude Range | Longitude Range | Region | Dusk/Dawn |
|---|---|---|---|
| 45°-50° | Pacific | A1 | Table A1 |
| 40°-45° | Pacific | A2 | Table A2 |
| ⋮ | ⋮ | ⋮ | ⋮ |
| 25°-30° | Pacific | A5 | Table A5 |
| 20°-25° | Pacific | A6 | Table A6 |
| 45°-50° | Mountain | B1 | Table B1 |
| ⋮ | ⋮ | ⋮ | ⋮ |
| 25°-30° | Mountain | B5 | Table B5 |
| 45°-50° | Central | C1 | Table C1 |
| 40°-45° | Central | C2 | Table C2 |
| ⋮ | ⋮ | ⋮ | ⋮ |
| 45°-50° | Eastern | D1 | Table D1 |
| ⋮ | ⋮ | ⋮ | ⋮ |
| 25°-30° | Eastern | D5 | Table D5 |
| 20°-25° | Eastern | D6 | Table D6 |

FIG. 25

| Date Range | Dawn | Dusk |
|---|---|---|
| DR1 | DAWN1 | DUSK1 |
| DR2 | DAWN2 | DUSK2 |
| ⋮ | ⋮ | ⋮ |
| DR20 | DAWN20 | DUSK20 |
| DR21 | DAWN21 | DUSK21 |
| ⋮ | ⋮ | ⋮ |
| DRN-1 | DAWNN-1 | DUSKN-1 |
| DRN | DAWNN | DUSKN |

MODULAR POWER ADAPTERS AND METHODS OF IMPLEMENTING MODULAR POWER ADAPTERS

RELATED APPLICATIONS

Applicant claims priority to provisional application U.S. Ser. No. 62/480,389, filed on Apr. 1, 2017, the entire application of which is incorporated by reference.

FIELD OF THE INVENTION

An embodiment of the present invention relates generally to power adapters, and in particular, to a modular power adapter and a method of implementing a modular power adapter.

BACKGROUND OF THE INVENTION

Power adapters, which control the application of power to a device, are an important part of any residential or commercial building, and can provide beneficial control of a load attached to the power adapter, such as timing control and other features such as dimming. As power adapters continue to advance, additional functionality may be available to a user. However, replacing a power adapter can come with significant expense. In addition to the cost of replacing the power adapter, it may be necessary to pay for the professional installation of the power adapter, such as in the case of an in-wall installed power adapter that is coupled to wires in a wall of a residential or commercial building.

Accordingly, circuits, devices, systems and methods that enable a user to implement different power adapters are beneficial.

SUMMARY

A power switch configured to apply power to a device is described. The power switch comprises a switching module having a switch for selectively applying power to a device based upon control signals; and a control module removably coupled to the switching module and in communication with the switching module when the control module is attached to the switching module; wherein the control module comprises a wireless communication circuit and provides the control signals to the switching module to enable a switching operation of the power switch.

Another power switch comprises a switching module having a first set of contacts for receiving control signals and a switch for selectively applying power to a device based upon control signals; and a control module removably coupled to the switching module and having a second set of electrical contacts in electrical communication with the first set of contacts when the control module is attached to the switching module; wherein the control module provides the control signals to the switching module by way of the second set of contacts.

A method of implementing a power switch configured to apply power to a device is also described. The method comprises removably coupling a control module to a switching module, wherein the control module has a set of electrical contacts and the switching module has a second set of contacts; generating, by way of the first set of electrical contacts of the control module, control signals; receiving the control signals at a switching module by way of the second set of contacts; and selectively applying power to a device based upon the control signals when the control module is attached to the switching module.

BRIEF DESCRIPTION OF THE DRAWINGS

FIG. 24 is a map showing the division of the geographical area of the map into a plurality of regions;
FIG. 25 is a table showing the definition of the plurality of regions and associated tables with the regions;
and
FIG. 26 is an example of a table that could be implemented as any one of the tables of FIG. 25.

DETAILED DESCRIPTION

Figure 1:
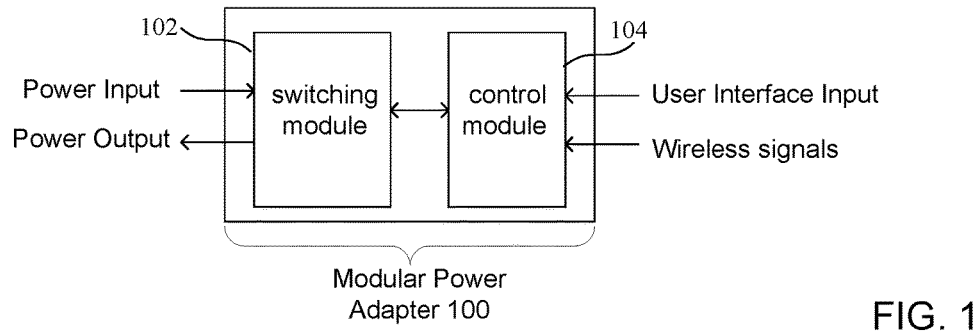
FIG. 1 is a block diagram of a modular power adapter.
Figure 2:
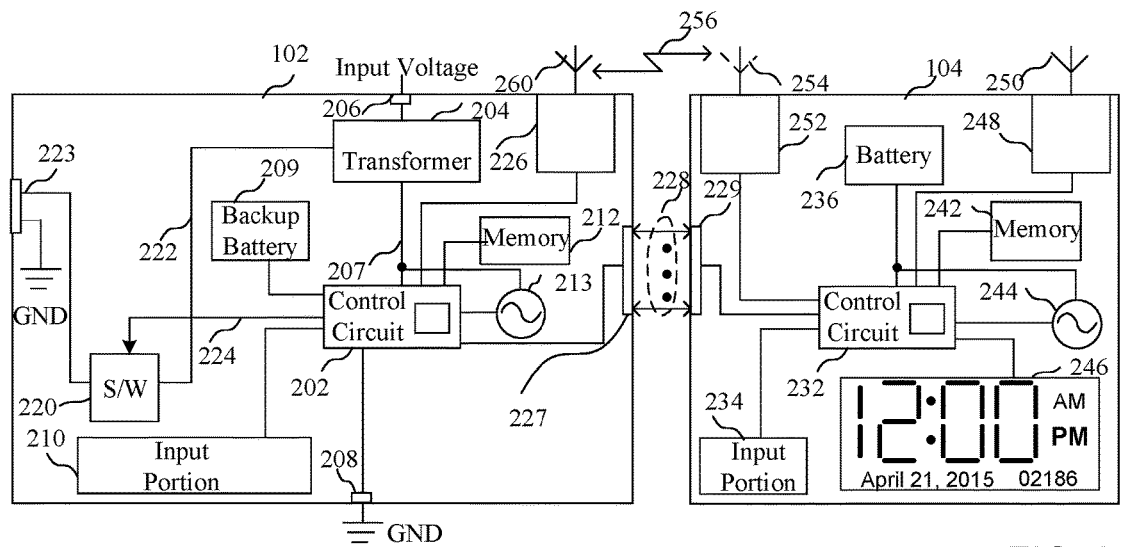
FIG. 2 is another block diagram of a modular power adapter.

The circuits, systems and methods set forth below and shown in the figures relate to power adapters, which may include "in-wall" adapters that are hard wired to electrical wires in a wall (such as to wires in a junction box for example) or plug-in adapters having prongs of a plug that are inserted into an electrical outlet. The circuits and methods provide a modular power adapter (as shown in FIGS. 1 and 2, where elements within or on another side of a device are shown in dashed lines), and split the functionality between a first portion, which could be a switching portion or module for enabling the switching of power to a device controlled by the modular power adapter and may be wired into a junction box, and a second portion, which may be a control portion or module that controls the switching of power received by a switching portion and applied to a device receiving power from the power adapter (such as a porch light controlled by a power adapter hard wired into a junction box or a lamp plugged into a plug-in adapter for example, where the porch light and the lamp are commonly known as a load). The power adapter may be implemented such that the first portion has switching elements that control the application of power to a load while the second portion provides signals to the first portion to control the switching elements. The second portion may be removably coupled to the first portion by way of attachment elements, where the second portion may provide electrical signals to the first portion by way of contact elements of the second portion, such as pogo pins or other flexible contacts or rigid contacts, coupled to corresponding contact elements of the first portion, such as contact pads. Alternatively, the contact elements could be placed on the first portion and the contact pads could be placed on the second element. However, it should be understood that any type of contact arrangement for providing electrical signals from the second portion to the first portion could be implemented. In addition to contact elements, guide or alignment elements could be used on the switching module or the control module to align the modules.

The modular power adapter is implemented to enable any one of a plurality of control modules (shown for example in FIGS. 3-8) to be coupled to the switching module, and control the switching operation of the switching module. By way of example, and without limitation, the control module could be a toggle switch (such as a paddle-type toggle switch as shown in FIG. 4) with a dimming function. The control module could optionally include a wireless module for enabling wireless control by way of any short range wireless connection, such as a circuit for implementing any variation of a Bluetooth protocol or a Near Field Communication (NFC) protocol, or any local wireless network, such as a WiFi network or a wide area network, such as a cellular network. It should be understood that the wireless module could be a removable module coupled to the switching module or the control module, enabling changing a wireless communication protocol used by the modular power adapter. According to another implementation, the control module comprises a motion detector having an on/off button. A further implementation may comprise a simple on/off switch, which may comprise a status LED light to indicate the state of the load that is under control of the switch, such as a porch light that may not be visible, and an optional wireless control circuit and/or an optional display. According to further implementations, any of the control portions may comprise a timer, which may have pre-programmed buttons or programmable buttons. A backup battery to maintain any timing patterns, such as schedules for applying power to a device, may be implemented on one or more of the switching portion or the control portion. The timing patterns include at least one on and off time, and may be associated with a certain day or date or group of days or dates. According to one implementation, a display would be implemented as a part of the switching module, where other interface elements could be a part of a control module or split between the switching module and the control module. According to another implementation, the display could be a part of the control module.

The control module could be attached to the switching module using any suitable attachment elements. For example, the bottom of the control module could include a flange that could be inserted into a flange receiving portion of the switching module in a "ski-boot" fashion, where attachment element on one or more of the top or sides of the control module may be used to secure the control module to the switching module. The attachment element could be any type of latching element or threaded element that could receive a screw to secure the control module to the switching module. The attachment element could also include a flange, snap, strap, magnet, Velcro portion, or any other means for securing the control module to the switching module.

The control module may have a flange extending from the sides around the perimeter or at least a portion of the perimeter to enable a user interface portion, which may include the display and any control actuators or elements, to extend through a recess in a wall plate. For example, many conventional switch devices have a user interface portion of approximately 3.2 centimeters (cm) by 6.6 cm that extends through a recess or opening in the wall plate that is secured to the switch device and covers the junction box. The perimeter of the opening in the wall plate may abut the flange of the control module to help secure the control module to the switching module. That is, the user interface portion of the control module beyond the flange could extend through the opening of the wall plate. Alternatively, the control module could extend into a recess of the switching module, where the perimeter of the opening of the wall plate would align with a flange or outer surface of a recessed portion of the switching module. According to other implementations, the control module could be removed while the wall plate is secured to the switching device. In either case, the modular nature of the modular power adapter may not be evident to a user. For a modular power adapter that is a plug-in device, the control module could (i) function as a cover for the switching module, (ii) could include openings to expose portions of the control module under the cover, or (iii) could be included under a cover generally having no other functionality.

A front surface of the power adapter, such as a surface of the recess of the switching module in an implementation having a recess, would include contact elements that would be coupled to corresponding contacts on the control portion to enable the control of a device using control signals coupled from the control device to the power adapter. While a physical electrical connection is shown by way of example, it should also be understood that communication of control signals or other signals could be achieved by another means, such as a wireless connection established between corresponding wireless communication circuits in the switching portion and the control portion. That is, in addition to any wireless connection between the control module and a wireless communication device, such as a smart phone or tablet computer for example, there may be a wireless connection, such as a Near Field Communication (NFC) connection, between the control module and the switching module. Further, it should be noted that the control module could be configured to provide multi-mode communication with communication devices external to the control module, such as multiple modules including both a WiFi module and a Bluetooth module for example. That is, a user could provide control signals from a communication device such as a smart phone or tablet computer using either a WiFi connection or a Bluetooth connection. The control module and/or the switching module could include a connector for receiving a portable memory device, such as a USB thumb drive, to download data, including timing patterns, operational information (e.g. at least one of time, data or location), firmware updates, or any other data which may enable the operation of the modular power adapter.

According to another implementation, the control module could be incorporated as a part of the wall plate as shown for example in FIGS. 11-14, enabling the implementation of a single switch module, where different control modules can provide different functionality. The single switch module could a simple toggle switch (or a paddle-type switch that fills the approximately 3.2 cm by 6.6 cm opening of the wall plate), where different control modules would interface (directly or wirelessly) with the switch module. For example, contacts on the control module (on the wall plate) could align with contracts on the switch module adjacent to the switch portion. The different control modules could provide different functionality, such as dimmer functionality or timer functionality. Some control modules could provide multiple functionality. The control module could be an integral part (i.e. not removable) of the wall switch plate, where a user would replace an entire wall plate to obtain the functionality of a different control module. Alternatively, the control module could be removably attached to the wall plate, where the user could remove one control module and replace it with another control module. According to another implementation, the wall plate could be configured to receive multiple control modules. For example, a control module could be placed on either side of the opening of the wall plate, where a second set of contact elements would be placed on the opposite side of the switch module of the first set of contact elements.

One benefit of the implementation of wall plates with control portions is that a single type of switch module could be implemented, and would be functional, without a control module. That is, if the basic switch module were implemented, and a conventional wall plate with no control module were used, a user could still use the basic switch module, which may only have on/off functionality. While the contact elements would not be used, a user could later add functionality of the basic switch module by using a wall plate that has a control module. Such an arrangement could also work with an outlet, where timing or dimmer functionality could be provided for one or more of the receptacles of the outlet. Control modules could also be implemented in wall plates having more than one opening, where different control modules can be implemented for switching modules associated with different openings of the wall plate.

In order to prevent any unauthorized use of a power adapter, such as a wireless power adapter, or to prevent the use of unauthorized control modules which may not operate safely with the switching module, one or more security features may be employed that would require that the control module and the switching module be paired. For example, it may be necessary to authenticate the control module by provide a security code from the control module to the switching module to ensure that the control module is authorized to operate with the switching module. For example, the security code could include a unique serial number and may be encrypted. The security code may also include a field that indicates the type of control module and provides information related to the functionality of the control module. A user may also be required to perform a certain operation when replacing the control module, such as implementing a reset procedure using reset buttons on one or both of the control module and the switching module. During a reset procedure, data may be downloaded from the control module to the switching module or vice versa to enable the switching module to function with the control module. The data may be operational data (i.e. data associated with features controlled by the switching module), or security or identification data (i.e. data indicating the identity of the control module or authorizing the use of the control module).

According to another implementation, a single controller can provide multimodal control of different control devices and different sets of control devices, such as the modular power adapters as described above or other timers or lighting control devices. The single controller could be for example a smart phone, a tablet computer or any other computer or device enabling a wireless connection to multiple control modules by way of different wireless protocols. For example, the controller could communicate with a first set of control devices by way of a first wireless connection and a second set of control devices by way of a second set of connections. The controller could communicate with any number of groups of devices on corresponding sets of communication protocols.

By way of example, a first set of devices could communicate with a control device by way of a Bluetooth connection, where the devices could be implemented in a Bluetooth mesh network. The devices of a first set could be implemented in different locations, such as an indoor device, an outdoor device, a device controlling a specific device, such as a water heater or an under-cabinet lighting fixture. A second set of devices could include devices that are controlled by the controller using another local area network, such as a WiFi network. The second set of appliances controlled by the devices could include the types of devices that a user may desire to access from a remote location, such as a curling iron, a coffee machine, a particular lamp or a wireless-controlled door lock. That is, these devices may be devices that a user may wish to check to make sure that they have been turned off, or the types of devices that a user may wish to turn on while they are away. A third set of devices could be other specialty devices such as pool controls or specialty lighting. These devices could be controlled by an appropriate wireless connection. The controller could also control devices by way of a proprietary network, such as connection using a Z-Wave or a ZigBee controller. That is, the system could be integrated with an existing system employed by the user, such as a Z-Wave or ZigBee system for example.

One beneficial aspect of the system is that a single controller can control a plurality of devices using a plurality of different connections implementing different wireless communication protocols. By implementing a variety of different communication protocols, it is possible to implement the different devices with the most suitable communication protocol from a single controller. For example, while a WiFi enables remote access, it may also be more susceptible to hacking or other security issues. However, a Bluetooth connection, because of its short-range nature, may have fewer hacking or security issues, but is generally not remotely accessible.

While the specification includes claims defining the features of one or more implementations of the invention that are regarded as novel, it is believed that the circuits and methods will be better understood from a consideration of the description in conjunction with the drawings. While various circuits and methods are disclosed, it is to be understood that the circuits and methods are merely exemplary of the inventive arrangements, which can be embodied in various forms. Therefore, specific structural and functional details disclosed within this specification are not to be interpreted as limiting, but merely as a basis for the claims and as a representative basis for teaching one skilled in the art to variously employ the inventive arrangements in virtually any appropriately detailed structure. Further, the terms and phrases used herein are not intended to be limiting, but rather to provide an understandable description of the circuits and methods.

Turning first to FIG. 1, a block diagram of a modular power adapter is shown. In particular, a modular power adapter 100 comprises a switching module 102 for controlling the application of power to a load (such as a light, appliance, or other device receiving power by way of an outlet, also known as a receptacle, or other contact elements applying power of the switching module) and a control module 104 that is in communication with the switching module. The switching module 102 is coupled to receive a power input signal, which may be power from an outlet to which the modular power adapter is plugged in or power from wiring in a residential or commercial building in which the modular power adapter is implemented for example. The output power is provided to an output such as an outlet into which a plug of an appliance or other device can be plugged or wires that are coupled to a device such as a light fixture for example. A light, appliance or other device receiving output power from the output is commonly called a load. The control module 104 may receive one or more of user interface input signals and wireless signals, as will be described in more detail below. While the modular power adapter 100 is shown as having two modules, it should be understood that the modular power adapter could contain more modules, where one of the switching module and the control module could be divided in sub-modules. For example, the control module could include a control portion and a wireless communication portion. That is, the control portion may include user interface elements, such as buttons or a display, and may be adapted to receive an optional wireless communication module.

Turning now to FIG. 2, another block diagram of a modular power adapter is shown. The block diagram of FIG. 2 shows elements of a modular power adapter, such as the modular power adapter of FIG. 1 for example. As shown in FIG. 2, a control circuit 202 is coupled to various elements of the switching module 102 to enable communication with the control module 104 and control the operation of the switching module. A transformer 204 is coupled to an input port 206 to receive an input voltage that enables providing power to a load by way of an output of the switching module. The input port could be for example wires or connector screws that are wired into a junction box or could be prongs of a plug adapted to be inserted into electrical outlet in a wall of a residential or commercial building. The transformer 204 provides power to the control circuit 202 by way of a power line 207. The control circuit also receives a ground potential at a ground terminal 208, which may be a ground wire or a ground prong of a plug of the switching module for example. The control circuit 202 may also receive power by way of a backup battery 209 to retain any information such as operational information or timing patterns. A different source of backup power could be implemented, such as a capacitor for example.

An input portion 210 may be implemented to enable the input of information or the selection of timing patterns (in an implementation having user interface elements on the switching module such as the implementation of FIG. 14 for example), and may include a control button or pairing button for enabling the pairing of the switching module and the control module as will be described in more detail in reference to FIG. 4. A memory 212 is coupled to the control circuit and may store operational information and timing patterns. An oscillator 213 may be coupled to the control circuit to enable the control circuit to maintain a current time. A switch 220 is coupled to receive power from the transformer by way of a power line 222 and provide power to an output 223 in response to control signals associated with a timing pattern on a line 224 from the control circuit. The output 223 may be an outlet that receives a plug for the device controlled by the modular power adapter (or wires or screws that can be coupled to wires) in the case of an in-wall power adaptor.

A wireless communication circuit 226 could be used to receive various information, such as operational information, programming data, or firmware updates from the control module 104 or some other source, as will be described in more detail below. It should be noted that the input portion of the modular power adapter may also include the connector for receiving the portable memory device such as a USB thumb drive or an SD memory to download any type of data, such as operational information, programming data, or firmware as will be described in more detail below.

The switching module 102 and the control module 104 may communicate by way of a communication port 227, which may be a connector or a plurality of contact elements, as will be described in more detail in reference to FIG. 4. The communication port 227 enables a communication link 228 with a communication port 229, which may also be a connector or a plurality of contact elements. The communication link may comprise contact elements of the communication ports 227 and 229 to enable the transfer of communication signals between the communication ports. The communication link may also provide power to power elements of the control module. According to some implementations, the communication link 228 may be a wireless communication link, where the communication ports comprise wireless communication circuits.

The control module 104 comprises a control circuit 232, which may be any type of processing circuit for (i) receiving inputs, such as by way of an input portion 234, and (ii) controlling the operation of the control module 104. The input portion could be implemented as shown and described in reference to FIGS. 9-13 for example. A battery 236 or some other source of energy such as a capacitor may be used to power the control module 104 or function as a backup power source if the control module 104 receives power by way of the communication port 229, rather than by way of a power source internal to the control module 104. A wireless communication circuit 248, which may be a wireless receiver or both a wireless transmitter and receiver (i.e. a wireless transceiver), comprises an antenna 250. Data received by the wireless communication circuit 248 may be provided to the control circuit 232, or data generated by the control circuit 232 may be transmitted by the wireless communication circuit 248. Data, such as a timing pattern or operational information entered by the input portion or received by way of the wireless communication circuit 248, may be stored in a memory 242. The wireless communication circuit 248 may be any type of receiver for receiving wireless communication signals, such as GPS receiver, a cellular receiver, a radio frequency (RF) receiver, or any type of receiver adapted to receive operational information, programming data or any other type of information such as software updates. The operational information may be provided to the control circuit to enable the operation of the control circuit and the implementation of the timing patterns on the remote switching device. The wireless communication circuit could be a global positioning system (GPS) receiver, a cellular receiver for a cellular telephone network, or a receiver for some other wireless network. A GPS receiver is commonly available from SiRF Technology, Inc, for example, while a cellular receiver could be implemented in an integrated circuit chip or module, such as a chip or module available from u-blox Holding AG of Thalwil, Switzerland. Therefore, actuators for entering time, date and location information in the various implementations of programming interfaces could be eliminated with the use of a wireless communication circuit 248, which may be a receiver or a transceiver having both a receiver and a transmitter. While the wireless communication circuit 248 for receiving communication signals from a remote network such as a GPS network or a cellular network is shown as a part of the control module 104, the wireless communication circuit 248 could be implemented as a part of the switching module 102. An oscillator 244 or some other device for keeping a time for the device may be coupled to the control circuit, where a current time or other data may be displayed on a display 246. While separate oscillators are shown in the switching module 102 and the control module 104, it should be understood that a single oscillator could be implemented, and an oscillating signal or other signal based upon the oscillating signal could be shared between the switching module 102 and the control module 104.

The control circuit 104 may also comprise a wireless communication circuit 252 having an antenna 254 enabling the communication of signals with a corresponding wireless communication circuit 226 (having an antenna 260) of the switching module by way of a wireless communication link 256. An example of a wireless communication circuit that could be implemented for wireless communication circuits 226 and 252 is shown by way of example in FIG. 3. While both a physical connection for transferring signals and/or power is provided by way of the communication link 228 and a wireless communication link 256 is provided by way of the corresponding wireless communication circuits 226 and 252, it should be understood that one or both of the communication links could implemented.

Figure 3:
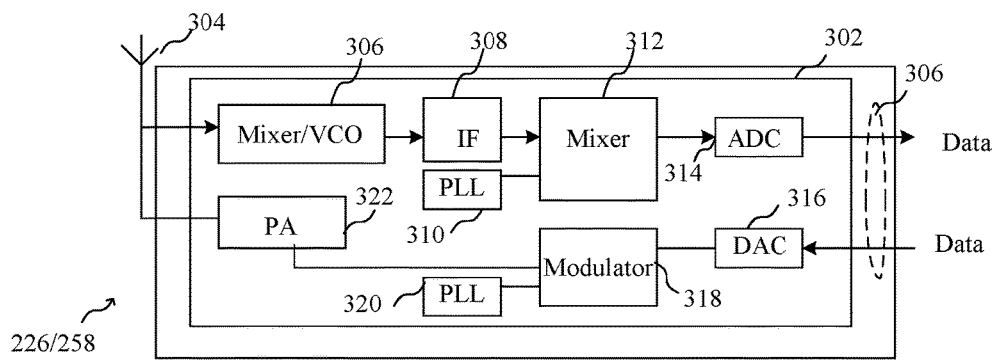
FIG. 3 is a block diagram of a wireless communication module of the modular power adapter of FIG. 2.
Figure 4:
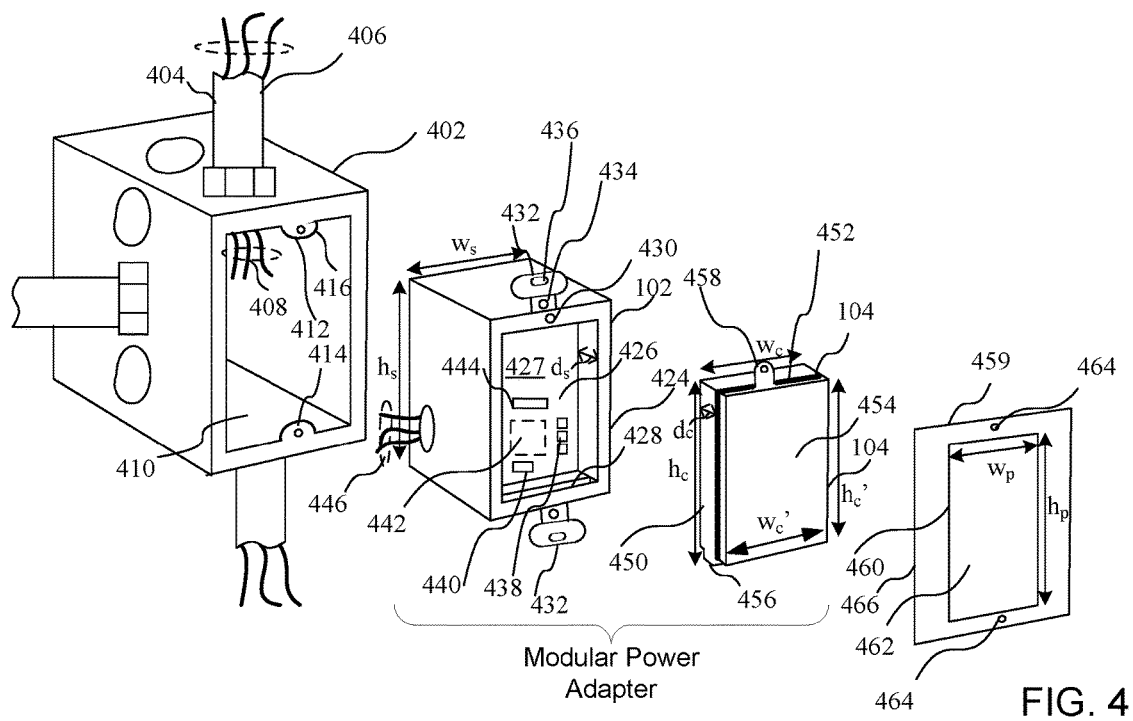
FIG. 4 is a block diagram of an expanded view of elements of an in-wall modular power adapter that is adapted to be installed in a junction box and to receive a wall plate.

Turning now to FIG. 3, a block diagram of a wireless communication module of the modular power adapter of FIG. 2 is shown. In particular, the antenna 304 receives wireless communication signals according to a predetermined wireless communication protocol. The data, which may include programming data and operational information, may be sent from the control module to the switching module. According to other implementations, data may be sent from the switching module to the control module. For example, power usage data associated with a device controlled by the switching module may be transferred to the control module. Other data, such as pairing commands and information, status information, or information, is received from a remote server as will be described in more detail in reference to FIG. 21. The received data is coupled to a combined mixer/voltage controlled oscillator 306, the output of which is coupled to an intermediate frequency (IF) circuit 308. Based upon outputs of the IF circuit and a phase locked loop (PLL) 310, a mixer 312 generates the received data. An analog-to-digital converter (ADC) 314 then generates digital data representing the data received by one of the control module or the switching module.

A control circuit of the switching module 102 or the control module 104 may also provide data for transmission to the other of the switching module 102 or control module 104. Data to be transmitted from the wireless communication circuit is coupled to a digital-to-analog converter (DAC) 316, the output of which is coupled to a modulator 318 which is also coupled to a PLL 320. A power amplifier 322 receives the output of the modulator to drive the antenna 304 and transmit the data. According to one embodiment, the data transceiver of FIG. 3 could implement the IEEE Specification 802.11 (WiFi) wireless communication standard, any Bluetooth standard, an infrared protocol, a Near Field Communication (NFC) standard, or any other wireless data protocol. While the circuit of FIG. 3 is provided by way of example, other wireless data transceivers could be employed according to the present invention to implement the desired wireless communication standard.

Turning now to FIG. 4, a block diagram of an expanded view of elements of an in-wall modular power adapter that is adapted to be installed in a junction box and to receive a wall plate is shown. According to the implementation of FIG. 4, a junction box 402 is coupled to conduit 404 having wires 406 that may be used to provide power to the modular power adapter by way of a terminal portion 408 of the wires that extend into a recess 410 adapted to receive the modular power adapter. Flanges 412 and 414 receive a screw or other attachment element by way of a threaded portion 416 to enable attaching corresponding flanges of the modular power adapter to the flanges 412 and 414.

The switching module 102 comprises a front surface 424 that defines a recessed portion 426 extending from the front surface to a back wall 427. The switching module 102 may also comprise a flange recess 428 at the bottom of the recessed portion behind the front surface 424. As will be described in more detail below, the flange recess 428 is adapted to receive a corresponding flange of a control module 104. The switching portion may also comprise an attachment element 430 adapted to be coupled to a corresponding attachment element of the control module. The switching module may also comprise a flanges 432 having a threaded portion 434 for receiving a screw to secure a wall plate to the modular power adapter and a hole 436 for receiving a screw that can be inserted into the threaded portion 416 and can be used to secure the switching module 102 to the junction box 402.

User interface elements and other elements enable a user to implement the switching module with a control module within the recess 426, such as a back wall of the recess for example (or on another surface accessible by a user in an implementation not having a recess). For example, a communication port 438, which may comprise a connector or a plurality of contact elements for example, may be implemented. The contact elements may be contact pads adapted to be in electrical contact with contact elements of the control module, where the contact elements may be spring loaded contacts such as pogo-pins, or other flexible or spring loaded contacts that extend from a back surface of the control module and align with and make electrical contact with the contact pads of the switching module. Alternatively, contact pads can be implemented on the control module and the corresponding contacts can be implemented on the back of the recess of the switching module. While the contact elements are indicated as being on the back surface of the switching module and the control module, it should be understood that the contacts can be placed on other surfaces, such as a side of the switching module and a side of the control module.

The switching module may also comprise a control button 440, which may function as a reset button or a pairing button for enabling the pairing of the control module with the switching module. The control button may be used to reset the switching module, enabling the switching module to receive new data associated with a control module, and therefore to enable the switching module and the control module to communicate and control a device receiving power from the switching module. The control button 440 could also enable a pairing function to pair an authorized control module to communicate with the switching module. That is, a pairing function can be implemented, wherein a control button on each of the switching module and the control module can be selected to enable the transfer of information between the control module and the switching module. It may be necessary to charge the control module by coupling the control module to the switching module to enable the control module to perform a reset operation of the control switch and to enable a pairing of the control module with the switching module.

The pairing operation is beneficial to ensure that only an authorized control module is implemented to prevent for example unauthorized control of a control module which may have a wireless control feature. For example, the control of the device receiving power from the switching module may be compromised, and unauthorized use of a device under the control of the switching module may occur. Further, the switching module and the control module may communicate to enable the proper operation of a load controlled by the switching module. For example, a control circuit of the switching module may detect the type of device controlled by the switching module, such as the type of light bulb (e.g. halogen, LED, or CFL), or the number of watts that the bulb or other device draws, and therefore enables the control circuit of the control module to provide different control signals to the switching module to control the amount of power applied to the light bulb (such as a dimmable light bulb). That is, in addition to an implementation where the switching module acts as a passive device, and only receives control signals from a control circuit of the control device, the switching module and the control module could implement a bidirectional communication link according to another implementation to enable the control module to understand information received by the switching module and better control the device controlled by the switching module. Alternatively, the control module can detect the type or qualities of the light bulb by way of the communication ports of the switching module and the control module.

A wireless communication module 442 (shown in dashed to indicate that it may be behind the back wall 427 of the recess) may also be implemented in the switching module. The wireless communication module 442 could be for example the wireless communication module 226 of FIG. 2 for example. A memory port 444, which may be a USB port or a port for receiving another type of memory card, such as an SD card, may be implemented on the switching module, and may receive any type of information, such as operational information, timing patterns for turning the device controlled by the power adaptor on or off, or other data that is beneficial in implementing the operation of the control module. A timing pattern may include for example on and off times for a timing feature of the modular power adapter. While the USB port is shown on the switching module, it should be understood that a USB port could instead be implemented on the control module, or implemented on the control module in addition to a USB port on the switching module. Wires 446 for receiving ground and power signals providing current to a load also extend from the switching module. While wires are shown, contact elements adapted to receive wires in a junction box such as a screw for securing a wire to the switching module, could also be implemented.

The control module 104 comprises a rear portion 450 that is inserted into the recess 426 and a flange 452 that abuts the front surface 424. A front surface of the flange 452 provides a surface to abut a perimeter edge 460 of an opening 462 of a wall plate 459, enabling a control interface 454, which may be a user interface according to the implementations of FIGS. 9-13, to extend through an opening 462 of the wall plate. The control module 104 also comprises a flange 456 according to the implementation of FIG. 4, enabling the control module to be attached to the switching module using a "ski-boot" arrangement, where the flange is inserted into the corresponding flange recess 428 and an attachment element 458 is attached to the attachment element 430. The communication port of the control module aligns with the communication port of the switching module to enable the communication of at least one of control signals and power between the switching module and the control module. The wall plate 459 can be attached to the mobile switching device using holes 464, where the holes receive screws that can be inserted into threaded portions 434 of the flanges 432.

The dimensions of the various elements of modular power adapter are selected to enable the modular power adapter to be attached to a junction box, such as a conventional residential junction box. Therefore, the width $w_s$ of the switching module may be selected to be less than the width of a conventional residential junction box, and the height $h_s$ may be selected to be less than the height of a conventional residential junction box. A depth $w_d$ of the recess 426 is also selected to ensure that, when the control module is attached to the switching module, the contact elements of the communication ports provide an adequate electrical connection to enable the transfer of data signals and/or power signals. That is, when the flange 452 of the control module abuts the front surface 424 of the switching module, the contact elements of the communication ports ensure that adequate pressure between contacts and contact pads will enable an electrical connection. Also, the dimensions of back portion 450 of the control module has a width $w_c$ and a height $h_c$ that are just slightly less that the width $w_s$ and the height $h_s$ to ensure that the control module fits into and aligns with the switching module. The dimensions of a front portion 454 are also selected to extend through opening 462 in a wall plate, and ensure that the edges of the opening of the wall plate abut the flange of the control module. A flange 456 of the control module is adapted to be inserted into the flange recess 428 of the switching module. The connector element 458 is adapted to be secured to a corresponding connector element 430 of the switching module 102. The edges 460 define opening 462. Because the height $h_p$ and the width $w_p$ of the opening 462 are slightly greater that the height $h_c'$ and the width $w_c'$ of the front portion 454', the front portion 454 can extend through the opening 462, where the edges 460 of the recess 462 will abut the flange 452. Outer edges 459 and 460 of the wall plate extend beyond the perimeter of the junction box to cover the junction box.

Figure 5:
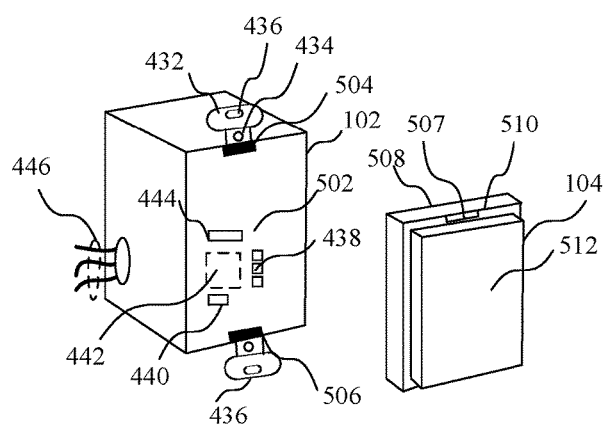
FIG. 5 is a block diagram of another in-wall modular power adapter.

Turning now to FIG. 5, a block diagram of another in-wall modular power adapter is shown. According to the implementation of FIG. 5, the control module is attached to the switching module such that the sides of the two modules are generally aligned, where a front portion of the control module is adapted to fit through the recess of the wall plate and a back portion of the control module acts as a flange that abuts the edges of the opening of the wall plate. More particularly, the switching module of FIG. 5 generally comprises a planar front surface that abuts a corresponding planar back surface of the control module. Elements may protrude from a planar surface of the switching module or the control module, or may be recessed within a planar surface, such as a connector protruding from or being recessed in a planar surface. By way of example, the connector element 438 or the memory port 444 may protrude from or be recessed in the planar surface 502, while the control button 440 may be flush with the planar surface 502. Attachment elements 504 and 506 may be adapted to couple with corresponding connector elements 507, which may be located at the top and bottom of the control module for example. The sides of a back portion 508 of the control module may align with sides of the switching module, where a surface 510 adjacent to a front portion 512 acts as a flange for the wall plate. According to one implementation, the attached elements 504 and 506 can be integrated in the planar surface 502 or can be integrated in the flanges 432.

Figure 6:
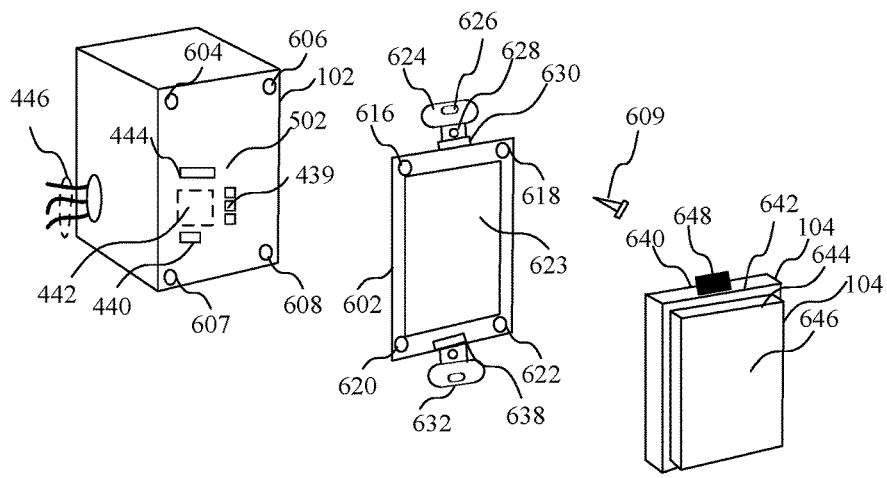
FIG. 6 is a block diagram of another in-wall modular power adapter having a metal plate comprising flanges for attaching the in-wall modular power adapter to a junction box.

Turning now to FIG. 6, a block diagram of another in-wall modular power adapter having a metal plate comprising flanges for attaching the in-wall modular power adapter to a junction box is shown. According to the implementation of FIG. 6, a plate 602, which may be a metal plate for example, can be attached to the switching module 102 and comprises connector elements to allow the control module 104 to be attached to the plate, and therefore interface with the switching module. By way of example, the switching module may comprise threaded portions 604-608 adapted to receive screws that would extend through corresponding holes 616-622 to enable the plate to be attached to the switching module. The plate also comprises an opening 623 enabling a front portion of the control module to extend through the opening 623. The plate 602 also comprises flanges extending from the top and bottom to enable attaching the modular power adapter to a junction box. A first flange 624 comprises a hole 626 for receiving a screw to be screwed into a threaded portion of the junction box. The flange also comprises a receptacle 628, such as a threaded portion, for a screw to enable attaching a wall plate to the modular power adapter. The plate may also comprise an attachment element 630 adapted to receive a corresponding attachment element of the control module. A second flange 632 extending from the bottom of the plate comprises an attachment element 638. The control module comprises a back portion 640 extending to a flange 642 that defines a front portion 644. A front surface 646 may comprise a user interface that is accessible to a user through the opening 623. An attachment element 648 that is adapted to couple with attachment element 630 is provided on the control module, such as on the back portion of the control module as shown. An example of an attachment element comprising corresponding attachment elements of the switching module and the control module is shown and described in reference to FIG. 7.

Figure 7:
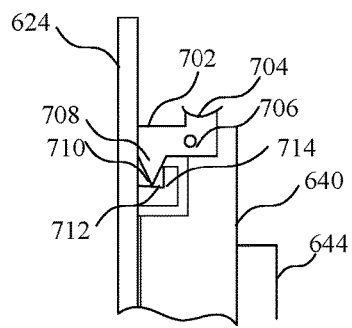
FIG. 7 is a block diagram of an exemplary attachment element enabling the attachment of a control module to a portion of the switching module.

Turning now to FIG. 7, a block diagram of an exemplary attachment element enabling the attachment of a control module to a portion of the switching module is shown. The rear portion 640 comprises a latching element 702 having a lever portion 704 and a pivot element 706 that enables a latching portion 708 having a beveled edge 710 to secure the control module to the flange 624. More particularly, the attachment element 630 of the flange 624 comprises a receiving element 712 and a flange 714 adapted to receive the beveled edge 710. While the attachment elements of the flange and control module of FIG. 7 provide one example of a means for attaching the control module to a portion of the switching module or flange, it should be understood that the control module could be attached to some other portion of the modular power adapter.

Figure 8:
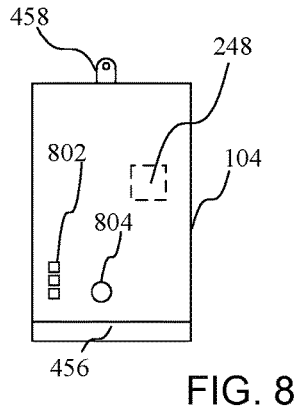
FIG. 8 is a plan view of the rear of a control module.

Turning now to FIG. 8, a plan view of the rear of a control module is shown. More particularly, contact elements 802 that may be coupled to or in electrical contact with the corresponding contact elements 438 of the switching module are shown on a back surface of the control module. A control button 804, which may be a pairing button for example, is also implemented. As described above in reference to FIGS. 4 and 5, the contact elements 802 may be contacts extending from the back surface, or contact pads that may be flush with the back surface or recessed.

Figure 9:
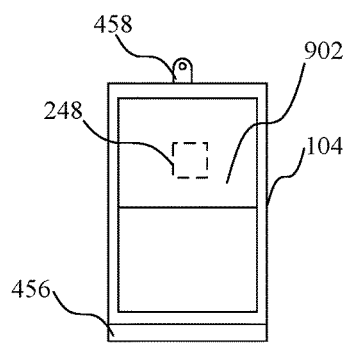
FIG. 9 is a plan view of the front of a control module having a paddle-type toggle switch.

Turning now to FIGS. 9-13, exemplary user interface portions of a control module are shown. While examples of user interfaces are provided, it should be understood that the user interfaces could include any type of user interface element enabling the operation or control of a power adapter, including the application of power to a device controlled by the power adaptor. Turning first to FIG. 9, a plan view of the front of a control module having a paddle-type toggle switch is shown. That is, a movable element 902 enables changing the state of a device controlled by the control module. The movable element 902 may be movable between a first position for an on state and a second position for an off state. That is, when in the on state, the top portion of the movable element may by flush with the wall plate. Similarly, in the off state, the bottom portion of the movable element may be flush with the wall plate. That is, a user could determine the state of the switch based upon a position of the paddle-type toggle switch. Alternatively, after a user selects either the top or the bottom of the paddle-type toggle switch, it would return to a normal resting position which does not indicate a state of the device, but rather where the switch is used for changing the state of the device.

Figure 10:
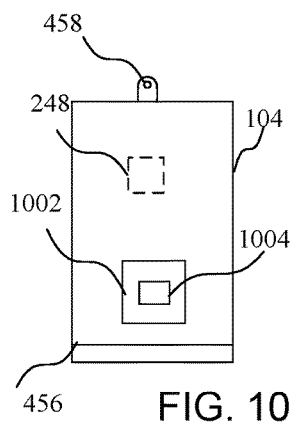
FIG. 10 is a plan view of the front of a control module having a push-button toggle switch.

Turning now to FIG. 10, a plan view of the front of a control module having a push-button toggle switch is shown. As shown in FIG. 10, the state of a device controlled by the switch can be changed by a button 1002, which may include a status indicator 1004, such as an LED for example. Alternatively, the button 1002 may be movable between a depressed state, where the switch will be pressed in when the switch is turned on, and a state where the button is flush with the front of the control module when the switch is turned off. In addition to indicating whether a light for example is on, the status indicator may also indicate whether a bulb is out; such as by flashing.

Figure 11:
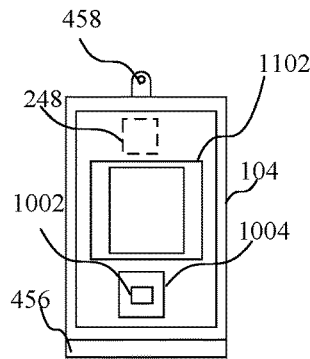
FIG. 11 is a plan view of the front of a control module having a push-button toggle switch and a sensor.

Turning now to FIG. 11, a plan view of the front of a control module having a push-button toggle switch and a sensor is shown. In addition to the switch 1002, a sensor 1102 can be implemented on the front portion of the control element. By way of example, a motion detector or an ambient light detector could be implemented on the front panel to automatically change the state of the switch based upon the detection of motion or the detection of a state of the light at the switch. It should be understood that the switch 1002 and the sensor 1102 could be implemented with timing functions of a programmable timer (i.e. a control circuit implementing a timing pattern for the power adapter).

Figure 12:
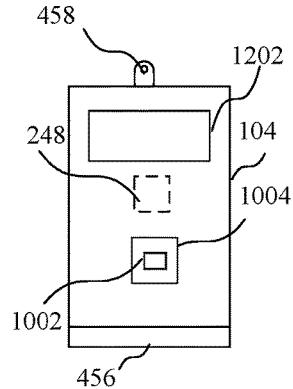
FIG. 12 is a plan view of the front of a control module having a push-button toggle switch and a display.

Turning now to FIG. 12, a plan view of the front of a control module having a push-button toggle switch and a display is shown. As shown in FIG. 12, a display 1202 may be implemented on the front surface of the control module. While a sensor is not shown in the implementation of FIG.

12, it should be understood that a sensor, such as the sensor of FIG. 12, could be implemented with the implementation of FIG. 12.

Figure 13:
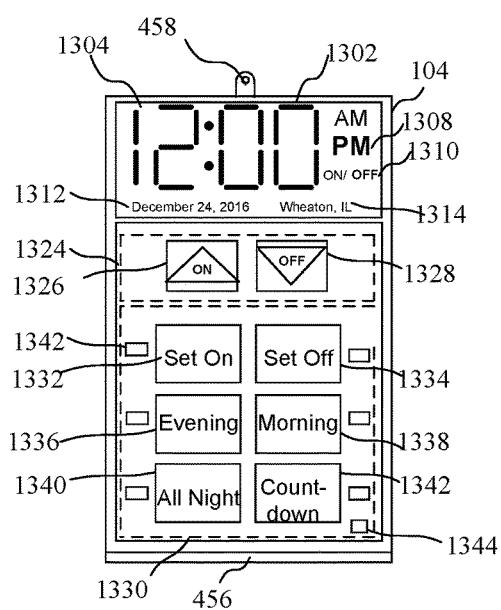
FIG. 13 is a plan view of the front of a control module having a plurality of pre-programmed or programmable buttons.

Turning now to FIG. 13, a plan view of the front of a control module having a plurality of pre-programmed or programmable buttons is shown. As shown in the implementation of FIG. 13, a plurality of buttons could be implemented on the front surface of the control module. The control module 104 may comprise a display 1302 having a time portion 1304, where the time portion of the display may indicate the current time or a time that is being programmed for example. The display may also include an AM/PM indicator 1308, and on/off indicator 1310, a date indicator 1312 and a location indicator 1314.

It should be noted that the control device could be programmed using a user interface, such as the user interface shown in FIG. 13. The user interface of the control device of FIG. 13 includes programmable buttons and pre-programmed buttons. More particularly, a programming portion 1324 of the user interface comprises a first programming button 1326, which could be used for cursoring up while programming or turning on a light or other device controlled by the control module 104 (when not in a programming mode), and a second programming button 1328, which could be used for cursoring down during a programming operation or turning off the light or other device controlled by the control device (when not in a programming mode). While the first programming button 1326 and the second programming button 1328 are shown as multifunction buttons for programming and controlling the device, it should be understood that one or more buttons having on and off functionality could be implemented separate from the first and second programming buttons.

A timer control portion 1330 comprises a first programmable button 1332, which may be programmed with an on time for a timing pattern, and a second programmable button 1334, which may be programmed with an off time for the timing pattern. The on time associated with the first programmable button 1332 may be programmed using the first programming button 1326 and the second programming button 1328 to cursor up and cursor down to reach the correct time that a user desires to turn on a device controlled by the control module 104. Similarly, the off time associated with the second programmable button 1334 may be programmed using the first programming button 1326 and the second programming button 1328 to cursor up and cursor down to reach the correct time that a user desires to turn off a device controlled by the control module 104. While the first programming button 1326 and the second programming button 1328 are shown as having only an on time and an off time respectively, where the buttons may be used together (i.e. when one of the buttons is selected, both will be selected), each of the first programming button 1326 and the second programming button 1328 could be programmable to have both an on time and an off time.

The pre-programmed buttons comprise buttons, that when selected, will implement switching data associated with a pre-programmed switching pattern. By way of example, an "Evening" button 1336 could be selected to turn on the lights between 6:00 PM and 11:00 PM or between dusk and 11:00 PM for example. A "Morning" button 1338 could have pre-programmed on and off times associated with hours that a user may desire to have lights on during the morning, such as between 5:00 AM and 8:00 AM for example. An "All Night" button 1340 could, when selected, turn on the lights at some time during the evening, such as a fixed time of 5:00 PM or a variable time such as dusk, and could turn the lights off at some time in the morning, such as 8:00 AM or a variable time such as dawn. A countdown function could also be implemented, where a device controlled by the timer may be on for predetermined intervals based upon the number of times the countdown button 1342 is selected. An indicator 1344, such as an LED, could be implemented to indicate when a certain pre-programmed button has been selected. The countdown function could also be accomplished using cursor buttons for scrolling up or down to select a countdown time.

A reset button, 1344, which may be a recessed button for example, enables resetting the timer to a default state. It should also be noted that while a pre-programmed button has a particular default setting for on and off times when a user acquires the timer, the pre-programmed buttons may be reprogrammed by a user to have different on and off times. For example, a user may decide that preferred times for an evening setting may be between 5:00 PM and midnight, where the user could reprogram the button to go on at 5:00 PM and off at midnight rather than 11:00 PM. Although different user interface features are shown by way of example, it should be understood that features of different embodiments can be combined to include a variety of different features.

Figure 14:
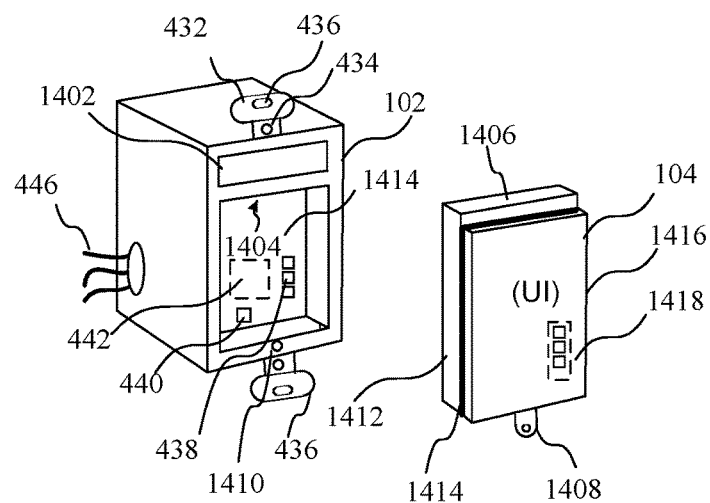
FIG. 14 is an expanded view of a modular power adapter having a display on a switching module.

Turning now to FIG. 14, an expanded view of a modular power adapter having a display on the switching module is shown. According to the implementation of FIG. 14, a display 1402 is provided on the switching module, where the control module comprises control circuits for controlling the operation of the switching module and any user interface elements that may be present on the front of the control module. A recess 1404 may be provided behind the front surface and below the display to receive a flange 1406, where an attachment element 1408 can be coupled to a corresponding attachment element 1410 on the switching module. That is, because of the location of the display, it may be beneficial to attach the control module at the bottom of the switching module. The rear portion 1412 will then be positioned within the recess 1414. The front portion 1416 is configured to extend through an opening in the wall plate. Contact elements 1418 on the back of the rear portion 1412, shown here in a dashed box, are positioned to make contact with corresponding contacts 438.

Figure 15:
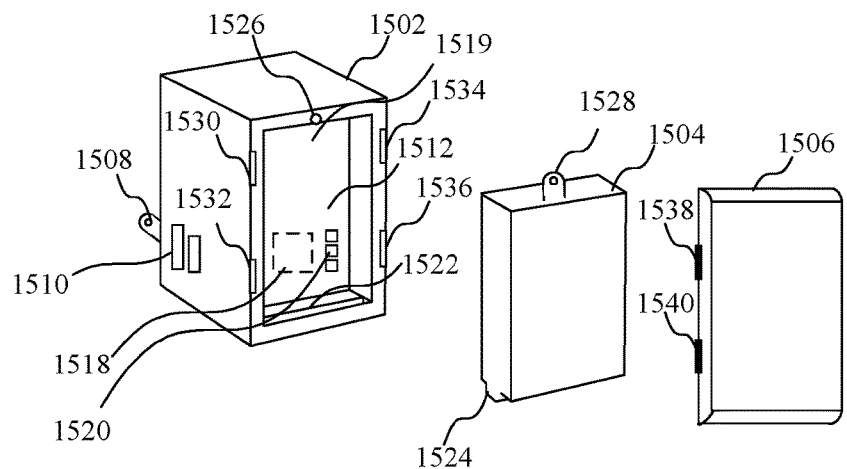
FIG. 15 is an expanded view of a plug-in type modular power adapter having a cover for a control module.

Turning now to FIG. 15, an expanded view of a plug-in type modular power adapter having a cover for a control module is shown. The plug-in type modular power adapter of FIG. 15 comprises a switching portion 1502 that is similar to the switching portion of an in-wall modular power adapter, except that the wires or contact screws that are used to wire the in-wall adapter are replaced with a plug and a receptacle by way of example. The power adapter of FIG. 15 also comprises a control portion 1504 that is adapted to attach to the switching module and a cover 1506 as shown that is adapted to cover the control portion 1504. The switching module comprises prongs 1508 of a plug to be inserted into a wall outlet, and a receptacle 1510 for receiving a plug of a device controlled by the power adapter.

A recessed portion 1512 is adapted to receive the control module 1504. A communication circuit 1518 may be located behind a rear wall 1519 of the recessed portion 1512, which may also comprise contacts 1520 that are adapted to align with corresponding contacts of the control module. A recess 1522 may be adapted to receive a corresponding flange 1524, where an attachment element 1526 is positioned to align with a corresponding attachment element 1528 of the control module. Attachment elements 1530, 1532, 1534, and 1536 are positioned to receive corresponding attachment elements on the cover 1506, where attachment elements 1538 and 1540 of the cover 1506 are adapted to align with and attach to attachment elements 1530 and 1532, respectively. The attachment elements on the cover 1506 may comprise flanges that are inserted into recesses of the attachment element of the switching module, where the sides of the cover can be squeezed toward the center to release the flanges and remove the cover.

Figure 16:
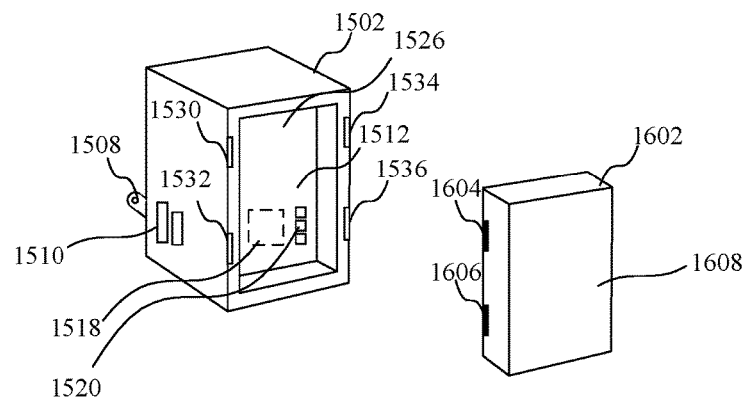
FIG. 16 is an expanded view of a plug-in type modular power adapter having a control module attached to a switching module.

Turning now to FIG. 16, an expanded view of a plug-in type modular power adapter having a control module attached to a switching module is shown. According to the implementation of FIG. 16, the control module 1602 also functions as the cover, where attachment elements 1604 and 1606 are adapted to be received by attachment elements 1530 and 1532. Attachment elements that are similar to attachment elements 1604 and 1606 are provided on the opposite side of the control module 1602 to attach to attachment elements 1534 and 1536. User interface elements may be implemented on the control module 1602, such as on a front surface 1608. The control module and user interface elements could be implemented as described above with respect to the in-wall power adaptor.

Figures 17, 18:
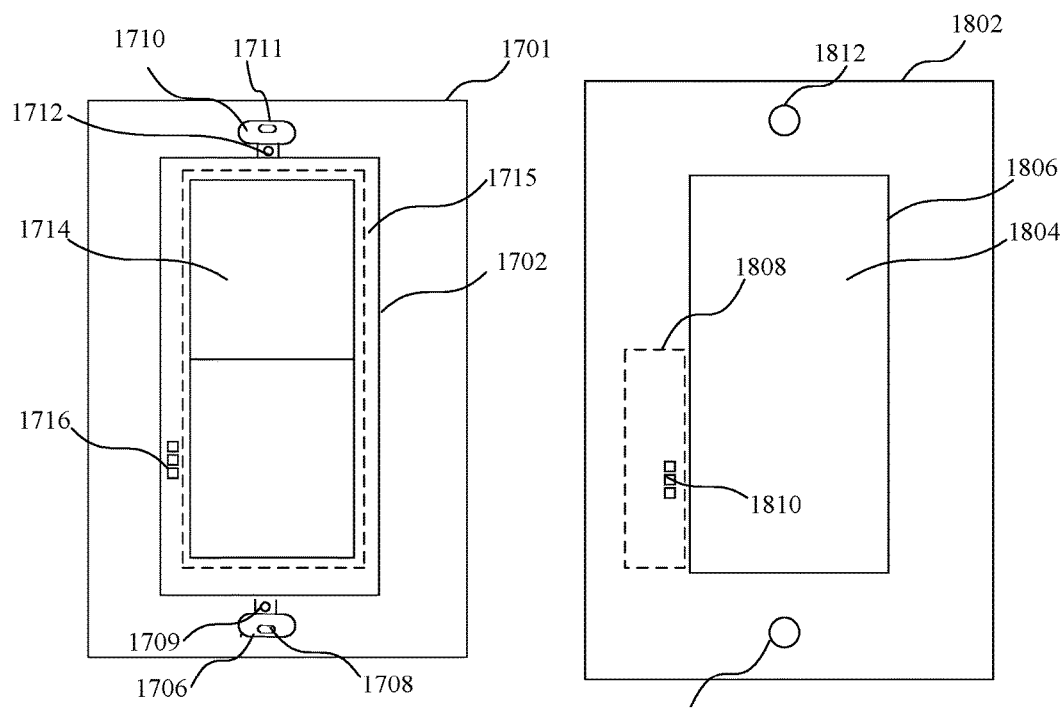
FIG. 17 is a plan view of a junction box having a switching module adapted to interface with a control module of a wall plate.
FIG. 18 is a front plan view of a wall plate having a control module.

Turning now to FIGS. 17-20, various implementations of a modular power adapter for in-wall applications includes a wall plate having control circuitry, such as a control module. Turning first to 17, a plan view of a junction box 1701 having a switching module 1702 adapted to interface with a control module of a wall plate is shown. As shown in FIG. 17, a switching module 1702 comprises flanges for attaching the switching module to the junction box, such as a first flange 1706 having a recess 1708 for receiving a screw to attach the switching module to the junction box and a threaded portion 1709 for receiving a screw for attaching a wall plate to the switching module, and a second flange 1710 having a recess 1711 for receiving a screw to attach the switching module to the junction box and a threaded portion 1712 for receiving a screw for attaching a wall plate to the switching module. A switching element 1714, shown here as a paddle-type toggle switch, enables changing the state of the device controlled by the switching module 1702. As will be described in more detail in reference to FIGS. 18-20, an edge of an opening of a wall plate having control circuitry overlaps with a portion of the control module, and may extend up to an overlap region shown by the dashed line 1715. Contact elements 1716, which are shown beyond (i.e. outside of) the dashed line 1716, and therefore would be under the wall plate when the wall plate is attached to the switching module. The contact elements 1716 are positioned to align with corresponding contact elements of a control module of the wall plate, which will be described in reference to FIG. 18.

Figure 19:
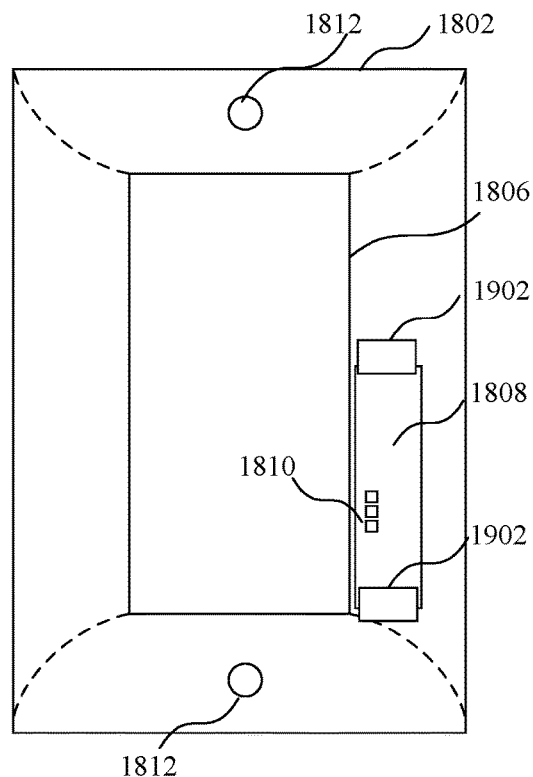
FIG. 19 is a rear plan view of the wall plate of FIG. 18.

Turning now to FIG. 18, a front plan view of a wall plate having a control module is shown. A wall plate 1802 comprises an opening 1804 that enables a switching element 1714 to extend through the wall plate, where an edge 1806 would extend to approximately the dashed line 1715 to cover the edges of the switching module. A control module 1808, shown in dashed lines to indicate that it is on a rear surface of the wall plate, includes contact elements 1810 to align with and electrically couple to corresponding contact elements 1716. Screw holes 1812 enable screws to be used to attach the wall plate to the switching module. As shown in FIG. 19, which provides a rear plan view of the wall plate of FIG. 18, attachment elements 1902 enable the control module 1808 to be removably attached to the wall plate. That is, the attachment elements 1902 would enable the control module 1808 to be switched out with a different control module to provide flexibility in the operation of the switching module. For example, a control module having a different wireless communication protocol could be attached to the wall plate, making it easy to change the functionality of the switching module without having to remove the switching module, which can costly and time consuming in the case of an in-wall power adapter.

Figure 20:
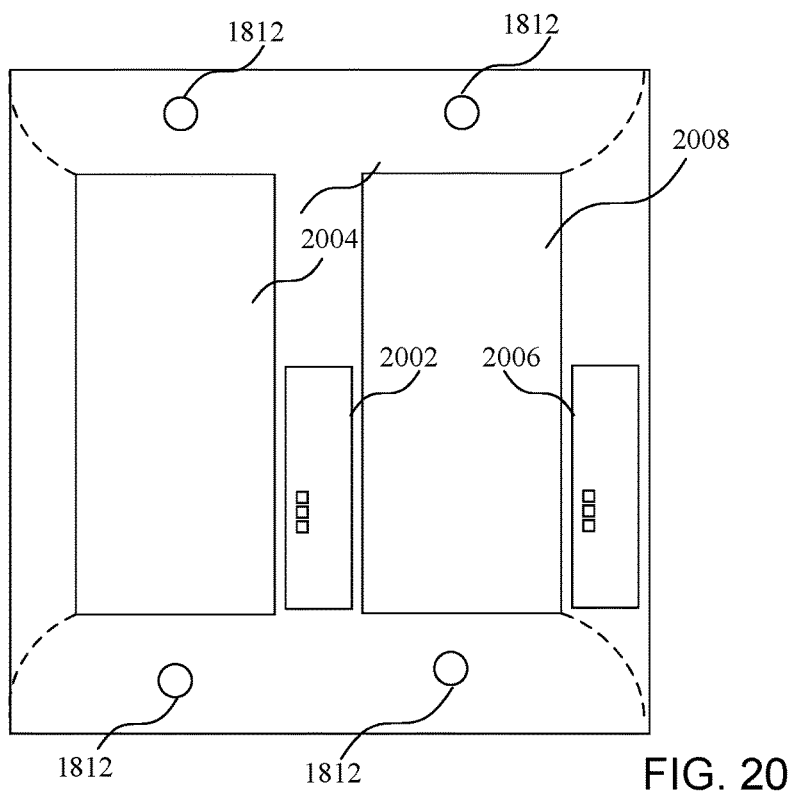
FIG. 20 is a rear plan view of a wall plate having two openings and two control modules.

Turning now to FIG. 20, a rear plan view of a wall plate having two openings and two control modules is shown. According to the implementation of FIG. 20, a first control module 2002 may be associated with a first opening 2004 of the dual-wall plate opening, while a second control module 2006 may be associated with a second opening 2008. While two openings are shown, it should be understood that any number of openings can be implemented.

Figure 21:
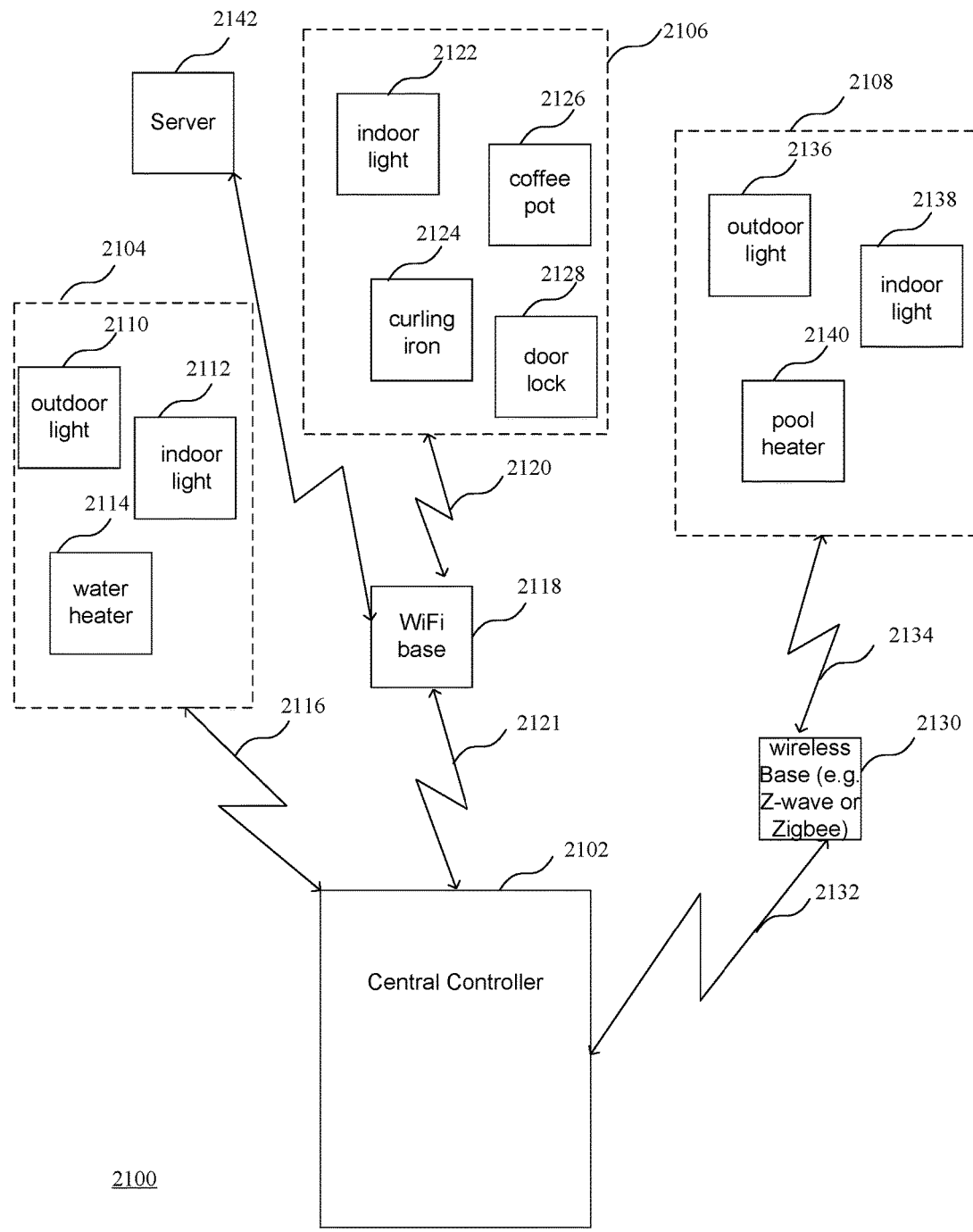
FIG. 21 is a block diagram of a system having a plurality of power adapters implementing different communication protocols.

Turning now to FIG. 21, a block diagram of a system 2100 having a plurality of power adapters implementing different communication protocols is shown. According to the implementation of FIG. 21, a single central controller 2102 can provide multimodal control of different control devices or different sets of control devices, such as the modular power adapters or other timers or lighting control devices. The control devices could be power adapters or other suitable control devices that could be coupled to control a device or integrated in the device to control the device. The single controller 2102 could be for example a smart phone, a tablet computer or any other computer or device enabling a wireless connection to multiple control modules by way of different wireless protocols. For example, the controller 2102 could communicate with a first set 2104 of control devices, a second set 2106 of control devices, and a third set of control devices 2108. The first set of control devices may include an outdoor light 2110, an indoor light 2112, and a water heater 2114 that are controlled by way of a first wireless connection 2116. As shown in FIG. 21, the central controller 2102 is directly in communication with devices of the first set of devices using a short range communication protocol. That is, there is no intervening control element, such as a base station or wireless hub, that receives control signals from the central controller and provides control signals to the control devices. By way of example, a first set of devices could communicate with central controller by way of a Bluetooth connection, where the devices could be implemented in a Bluetooth mesh network, or a near field communication (NFC) link. The short range communication protocol may be accessible at a distance of approximately 100 feet for example. The devices of a first set could be implemented in different locations, and could include for example an indoor device, an outdoor device, a device controlling a specific device, such as a water heater or an under-cabinet lighting fixture. The first set of control devices could be associated devices that a user does not wish to access remotely, or a device about which the user may have security concerns and may not want to have controlled by a lower security protocol, such as a IEEE 802.11 communication protocol, also known as WiFi. The first communication protocol may therefore be a local communication protocol, and more particularly a direct local communication protocol.

The second set 2106 of control devices may be controlled by way of a second connection, which may be for example a network. The second set of devices 2106 could include devices that are controlled by the controller using a local area network, including a base station or wireless hub that communicates with a plurality of devices. By way of example, the local area network (LAN) could be a WiFi network including a WiFi base 2118 enabling communication links 2120 and 2121. The local area network could also be accessible by a wide area network such as a cellular network to enable remote access to devices. The WiFi network could be any network implementing any IEEE 802.11 standard for example. The second set of appliances controlled by the devices could include the types of devices that a user may desire to access from a remote location, such as an indoor light 2122, a curling iron 2124, a coffee machine 2126, a particular lamp, or a wireless-controlled door lock 2128. That is, these devices may be devices that a user may wish to check to make sure that they have been turned off, or the types of devices that a user may wish to turn on while they are away.

The third set of devices 2108 could be controlled by another wireless base 2130 enabling communication links 2132 and 2134 to control other specialty devices such as pool controls or specialty lighting. According to the example of FIG. 21, an outdoor light 2136, and indoor light 2138, and a pool heater 2140 could be controlled by the wireless base 2130. The wireless base 2130 could be a Z-Wave or a ZigBee controller for example. Therefore, a short range communication link or a WiFi connection of system 2100 could be integrated with an existing system employed by the user, such as a Z-Wave or ZigBee system for example.

One beneficial aspect of the system is that a single controller can control a plurality of devices using a plurality of different connections implementing different wireless communication protocols and having different capabilities. The controller can also access a server 2142 by way of one of the elements of the system, such as the WiFi base 2118. The server may receive information from or provide information to the server 2142. For example, the server may receive information from the central controller related to the state or operation of various devices on the system 2100, or may provide information or data enabling the operation of the devices on the system 2100. For example, the information can be related to analysis of the devices implemented on the system, or could be information of interest to a user, such as news or weather, which could be displayed on a device of the system. By implementing a variety of different communication protocols, it is possible to implement the different devices with the most suitable communication protocol from a single controller. For example, while a WiFi enables remote access, it may also be more susceptible to hacking or other security issues. However, a Bluetooth or NFC connection, because of its short-range nature, may have fewer hacking or security issues, but is generally not remotely accessible.

Figure 22:
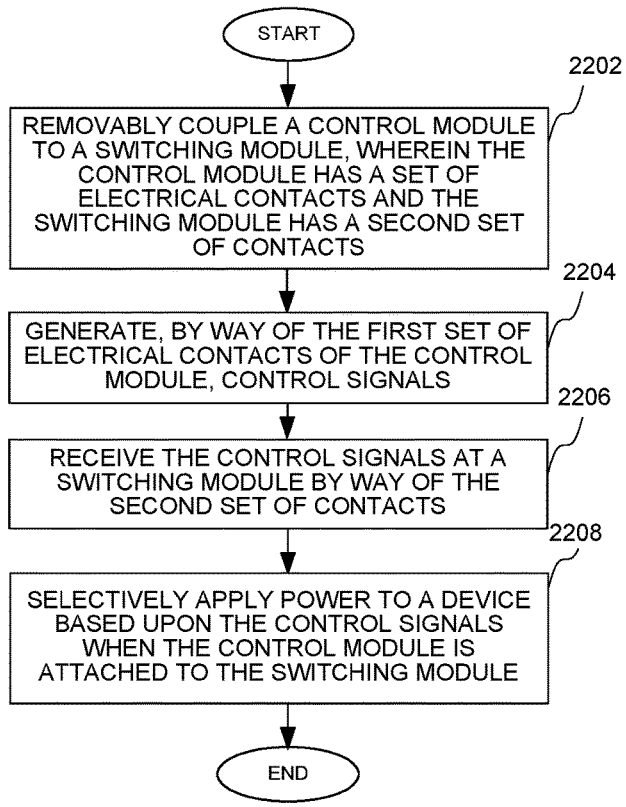
FIG. 22 is a flow chart showing a method of implementing a modular power adapter.

Turning now to FIG. 22, a flow chart shows a method of implementing a modular power adapter. A control module is removably coupled to a switching module at a block 2202, wherein the control module has a set of electrical contacts and the switching module has a corresponding second set of electrical contacts. Control signals are generated by way of the first set of electrical contacts of the control module at a block 2204. The control signals are received at a switching module by way of the second set of electrical contacts at a block 2206. Power is selectively applied to a device based upon the control signals when the control module is attached to the switching module at a block 2208.

The method may further comprise receiving electrical power at a plurality of contact elements, wherein the contact elements may comprise prongs adapted to be inserted into an electrical outlet. The power switch may further comprise a receptacle for receiving a plug of the device controlled by the power switch. The method may further comprise changing the state of the device controlled by the power adapter in response to a switching element for manually controlling the operation of the power switch. The method may also enable a manual programming of the power switch on a user interface, and displaying information on a display of the control module.

Figure 23:
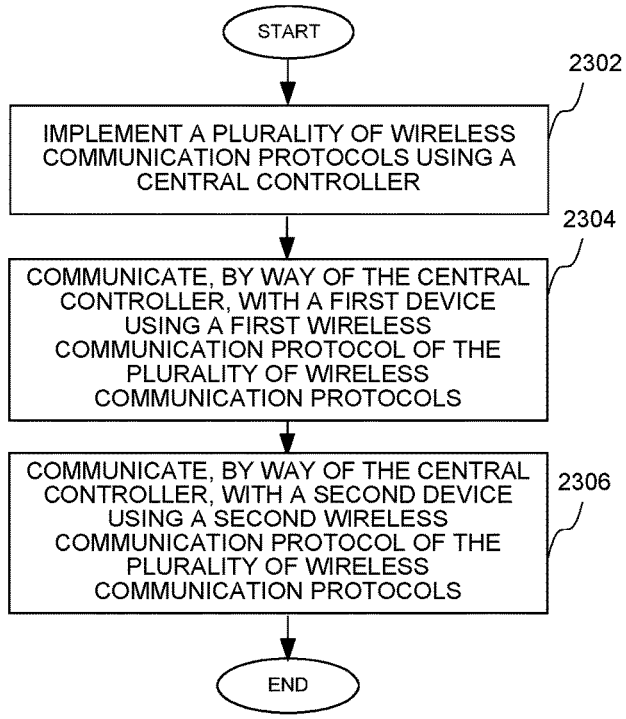
FIG. 23 is a flow chart showing a method of controlling power adapters using a plurality of different communication interfaces.

Turning now to FIG. 23, a flow chart shows a method of controlling power adapters using a plurality of different communication interfaces. A plurality of wireless communication protocols are implemented using a central controller at a block 2302. A first device communicates, by way of the central controller, using a first wireless communication protocol of the plurality of wireless communication protocols at a block 2304. A second device communicates, by way of the central controller, using a second wireless communication protocol of the plurality of wireless communication protocols at a clock 2306.

Turning now to FIGS. 24-26, a map showing latitude and longitude lines which could be used to divide a geographical region, shown here by way of example as the United States. It should be noted that the latitude and longitude lines are shown by way of example, and are not intended to necessarily show accurate latitude and longitude lines. Also, while 24 regions of the lower 48 states of the United States are created by latitude and longitude lines as shown, it should be understood that any number of regions could be created by greater or fewer latitude and longitude lines. The selected longitudinal and latitudinal lines need not be separated by the same number of degrees (e.g. 5 degrees) as shown in FIG. 24, but may be separated by different numbers of degrees. Also, the lines need not be continuous on the same horizontal or vertical. For example, the three vertical lines within the boundary of the lower 48 states could correspond to the time zone lines that create the 4 time zone regions, Pacific, Mountain, Central and Eastern. It should be noted that certain geographical regions within the United States apply different rules related to the changing of times during daylight savings and standard time. As a result, separate tables providing dusk and dawn data may be used for daylight savings time and standard time. It should be noted that the dusk and dawn data could be updated over time to account for changes in daylight savings time rules by reprogramming a control device or a remote switching device. The devices could be reprogrammed by downloading new data by way of a data port, such as a USB port as described above, or via cellular communication to a cellular receiver on the control device or a remote switching device.

As shown in FIG. 25, a table having combinations of latitude and longitude ranges is provided to enable a power switch to access an appropriate table having dusk and dawn times to be applied with implementing a timing pattern as described above. For a power switch having a GPS receiver or some other receiver that is capable of receiving location information, such as latitude and longitude values associated with the location of the power switch, the received latitude or longitude values are used to determine a region in which the power switch is located, and therefore enable selecting a table associated with the region for applying appropriate dusk and dawn times. An example of a table associated with a region will be described in more detail in reference to FIG. 26. While a reference to a table is provided by way of example, it should be understood that a reference to equations or other algorithms for calculating dusk and dawn times could be provided. That is, based upon time and date, a dawn and dusk time could be calculated for a given region.

As shown in FIG. 26, an example of a table having a plurality of date ranges and corresponding dusk and dawn times that would be applied for a timing pattern implemented by a power switch, such as any of the power switches described above, is shown. FIG. 26 shows an example of one table, where a separate table would be implemented for each region and would have dusk (DUSK1-DUSKN) and dawn (DAWN1-DAWNN) times associated with date ranges for that region. The dusk and dawn times could be based upon averages for the region, or could be weighted to be optimized for the most populous area of the region.

According to the example regions of FIG. 24, 24 tables could be stored in a memory of the device and would be available to be accessed by a device, such as a control device or a remote switching device, in any one of the 24 regions, where a power switch in region A2 would access Table A2 to implement dusk and dawn times in a timing pattern. According to the example table of FIG. 26, a plurality of date ranges extending from 1 to N, where N can be any number up to 365. That is, N could be selected to provide a date range for a predetermined number of days. For example, N could be 12, where dusk and dawn times would change 12 times during the year, such as on the first of every month. N could be selected to be 52, where dusk and dawn times would change 52 times a year, such as every Sunday. N could even be selected to be 365, where the dusk and dawn times would change every day. For the N date ranges, the number of dates of each date range need not have the same number of days. For example, there may be some periods of time of the year during which the dusk and dawn times change less rapidly. During those times, the date range could be longer. In contrast, at certain times such as during fall and spring, the dusk and dawn times may change at a greater rate each day or week. During these times, it may be beneficial to have fewer days associated with a date range.

It can therefore be appreciated that new circuits for, systems for and methods of implementing a module power adapter have been described. It will be appreciated by those skilled in the art that numerous alternatives and equivalents will be seen to exist that incorporate the disclosed invention. As a result, the invention is not to be limited by the foregoing embodiments, but only by the following claims.

I claim:

1. A power adapter configured to apply power to a device, the power adapter comprising:
   a switching module having a recess comprising a first set of contacts for receiving control signals, wherein the switching module comprises a switch for selectively applying power to an outlet of the switching module based upon the control signals; and
   a control module removably coupled to the switching module and having a second set of contacts coupled to the first set of contacts of the switching module when the control module is attached to the switching module;
   wherein the control module comprises a wireless communication circuit and provides the control signals to the switching module to enable a switching operation of the power adapter.

2. The power adapter of claim 1 wherein the switching module of the power adapter comprises a third set of contacts for receiving electrical power.

3. The power adapter of claim 1 wherein a security code is transferred between the first set of contacts and the second set of contacts to enable an operation of the control module with the switching module.

4. The power adapter of claim 1 wherein the control module comprises a switching element for manually controlling the application of power to the outlet of the switching module of the power adapter.

5. The power adapter of claim 1 further comprising a button for resetting the control module of the power adapter.

6. The power adapter of claim 1 wherein the control module provides identification data associated with the control module to the switching module.

7. The power adapter of claim 1 wherein the wireless communication circuit is adapted to receive a timing pattern from a remote device, wherein the timing pattern controls the application of power to the outlet of the switching module.

8. A power adapter configured to apply power to a device, the power adapter comprising:
   a switching module comprising a recess having a first set of contacts for receiving control signals and a switch for selectively applying power to an outlet of the switching module based upon the control signals; and
   a control module removably coupled to the switching module and having a second set of contacts in electrical contact with the first set of contacts when the control module is attached to the switching module;
   wherein the control module comprises a wireless control module and provides the control signals to the switching module by way of the second set of contacts to control the application of power to the outlet of the switching module; and
   wherein the control module comprises a status light indicating a status associated with the power adapter.

9. The power adapter of claim 8 wherein the status light of the control module of the power adapter enables providing a state of a load that is under the control of the power adapter.

10. The power adapter of claim 8 wherein the power adapter further produces power usage data.

11. The power adapter of claim 8 wherein the control module comprises a switching element for manually controlling the application of power to the outlet of the switching module of the power adapter.

12. The power adapter of claim 8 further comprising a button for resetting the control module of the power adapter.

13. The power adapter of claim 8 wherein the control module is paired to the switching module to enable communication between the control module and the switching module.

14. The power adapter of claim 8 wherein the control module comprises a wireless communication circuit and is configured to receive a timing pattern from a remote device for controlling the application of power to the outlet.

15. A method of implementing a power adapter configured to apply power to a device, the method comprising:
   removably coupling a control module having a wireless communication circuit to a switching module, wherein the control module has a first set of electrical contacts and the switching module has a second set of electrical contacts;
   generating, by way of the first set of electrical contacts of the control module, control signals;
   receiving the control signals at the switching module by way of the second set of electrical contacts; and
   selectively applying power to an outlet of the switching module based upon the control signals when the control module is attached to the switching module.

16. The method of claim 15 wherein the control module of the power adapter comprises a button, the method further comprising enabling a resetting of the control module using the button.

17. The method of claim 16 wherein the control module is adapted to receive a timing pattern from a remote device for controlling the application of power to the outlet of the switching module.

18. The method of claim 15 further comprising changing the state of the device controlled by the power adapter in response to a switching element for manually controlling the application of power to the outlet of the power adapter.

19. The method of claim 15 further comprising enabling resetting the control module of the power adapter using a button on the control module.

20. The method of claim 15 further comprising enabling pairing the control module and the switching module to enable communication between the control module and the switching module.

\* \* \* \* \*